United States Patent [19]

Achiwa et al.

[11] Patent Number: 5,613,088
[45] Date of Patent: Mar. 18, 1997

[54] RAID SYSTEM INCLUDING FIRST AND SECOND READ/WRITE HEADS FOR EACH DISK DRIVE

[75] Inventors: Kyosuke Achiwa, Hino; Akira Yamamoto, Sagamihara; Tetsuhiko Fujii, Kawasaki; Takao Satoh, Sagamihara; Masafumi Nozawa, Odawara, all of Japan

[73] Assignee: Hitachi, Ltd., Tokyo, Japan

[21] Appl. No.: 273,171

[22] Filed: Jul. 26, 1994

[30] Foreign Application Priority Data

Jul. 30, 1993 [JP] Japan .................................. 5-189622

[51] Int. Cl.⁶ .................................................. G06F 12/02
[52] U.S. Cl. ......................... 395/482; 395/439; 395/441; 360/109
[58] Field of Search ........................ 395/441, 182.04, 395/439, 440, 482; 360/64, 65, 97.01, 98.01, 98.07, 109, 122; 369/48

[56] References Cited

U.S. PATENT DOCUMENTS

| | | | |
|---|---|---|---|
| 3,729,725 | 4/1973 | Denney et al. | 360/64 |
| 4,602,301 | 7/1986 | Saito et al. | 360/69 |
| 4,740,942 | 4/1988 | Ogino et al. | 369/48 |
| 5,155,811 | 10/1992 | Dean et al. | 395/250 |
| 5,233,483 | 8/1993 | Uchiyama | 360/64 |
| 5,339,319 | 8/1994 | Yamane et al. | 371/10.2 |
| 5,487,160 | 1/1996 | Bemis | 395/441 |

OTHER PUBLICATIONS

A Case for Redundant Arrays of Inexpensive Disks (RAID), Patterson, et al., pp. 109–116.

*Primary Examiner*—Eddie P. Chan
*Assistant Examiner*—Hiep T. Nguyen
*Attorney, Agent, or Firm*—Antonelli, Terry, Stout & Kraus, LLP

[57] ABSTRACT

A disk array apparatus, which has redundant data arranged in a distributing layout by record includes apparatus for speeding up redundant data updating processing during later updating, apparatus and a read head and write head securely mounted on a single actuator. In operation, old parity data is read out by the read head and then is used to generate new, updated parity data. The updated parity data is written into the record where the old parity data was held within one turn of the disk after the old parity data has been read out.

33 Claims, 20 Drawing Sheets

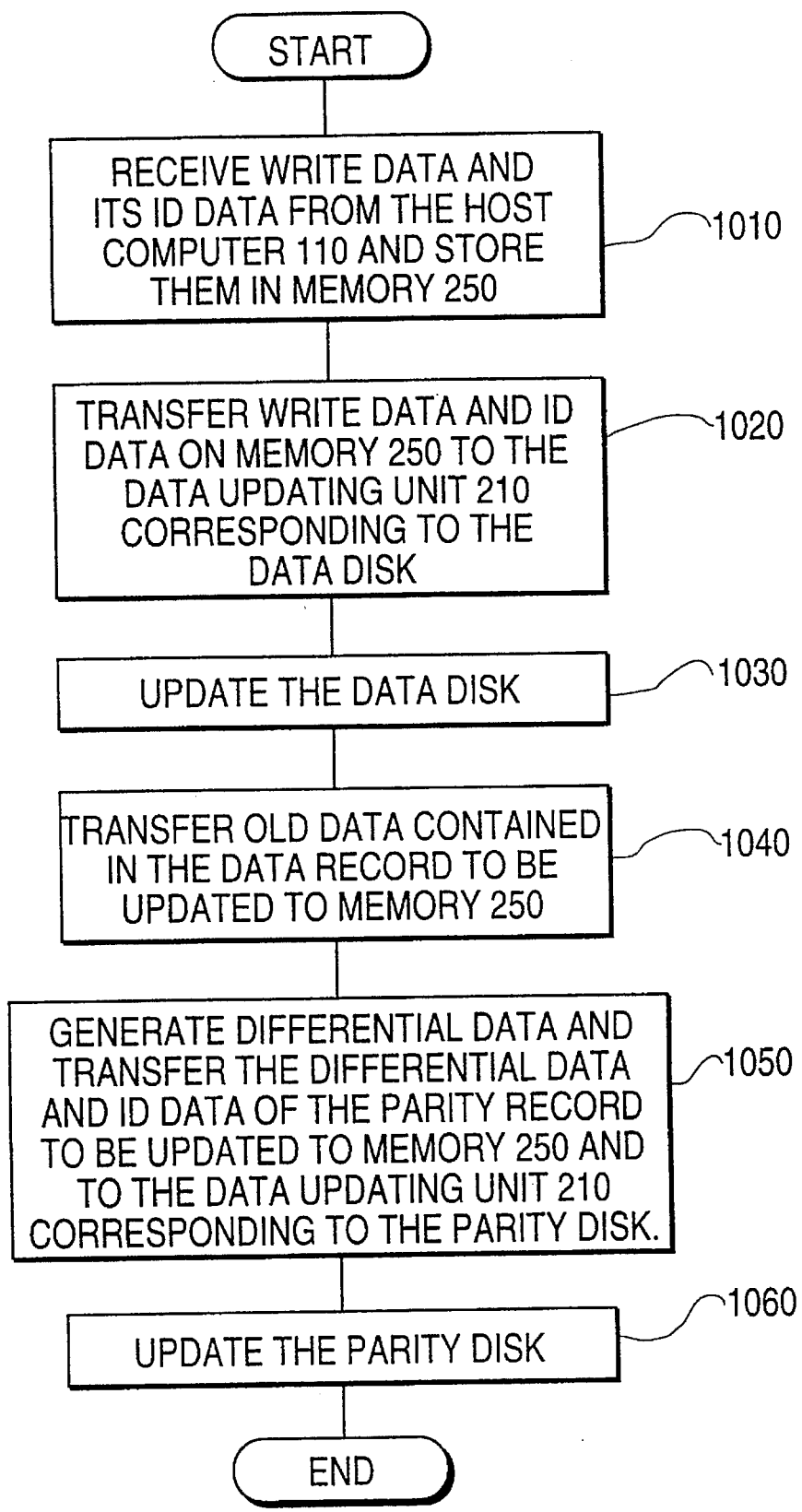

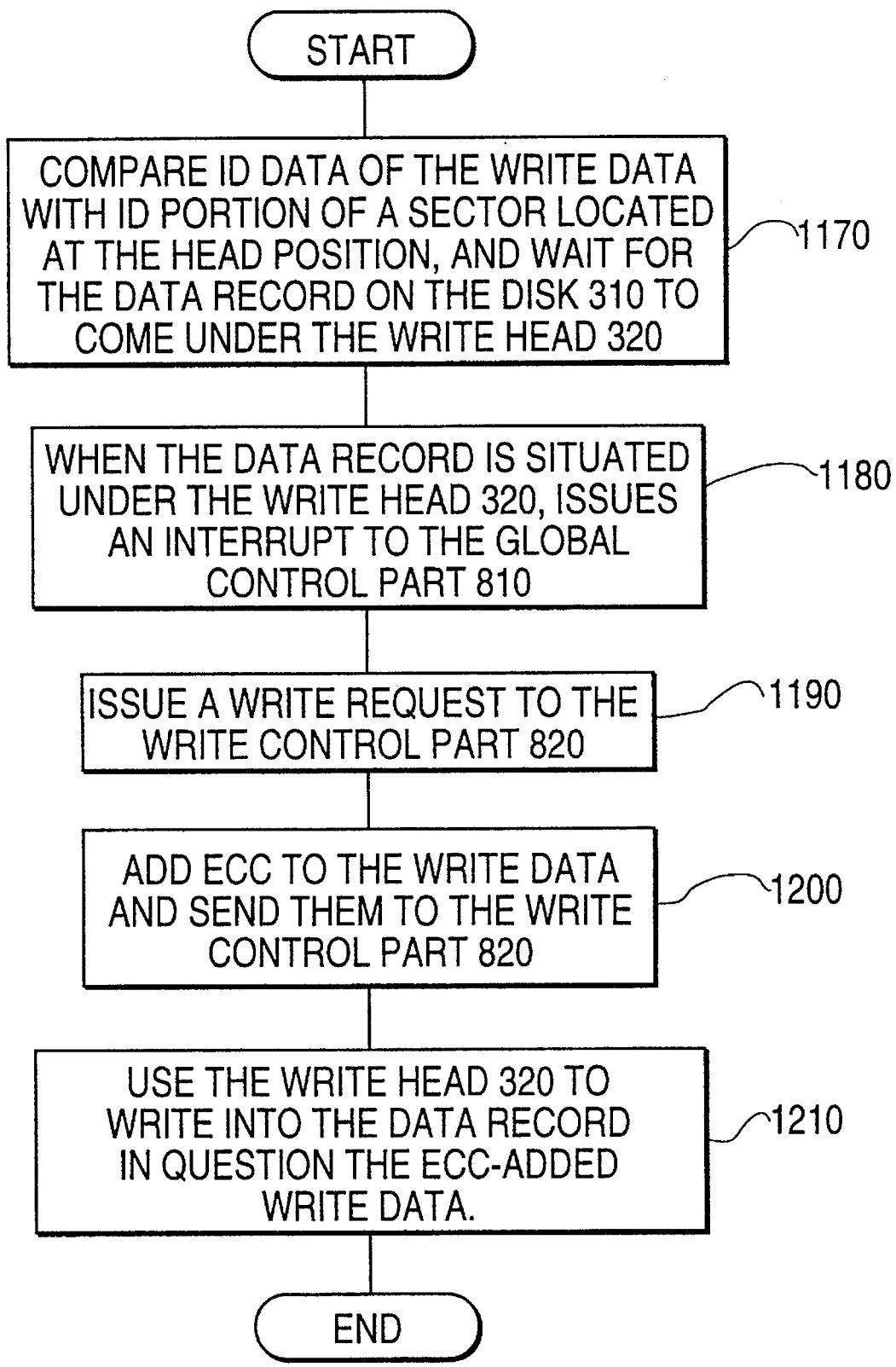

RAID SYSTEM INCLUDING FIRST AND SECOND READ/WRITE HEADS FOR EACH DISK DRIVE

BACKGROUND OF THE INVENTION

The present invention relates to a storage system used in computer systems. More particularly, the present invention relates to a storage system having a disk array of multiple disk drives having a two head configuration for reading data from a sector, operating on the data and writing the operated on data back to the sector.

Conventionally, it is well known to use a disk array which employs a plurality of small-capacity disk drives as a memory for high performance and high reliability. The disk array consists of two or more disk drives that work as a single disk drive for the computer. Such a disk array has been disclosed in a publication entitled "A Case for Redundant Arrays of Inexpensive Disks (RAID)," ACM SIGMOD conference proceeding, Chicago, Ill., Jun. 1–3, 1988, pp.109–116" by D. Patterson, et al.

The above-described publication by Patterson, et al. discloses, in particular, a technology concerning a data distributing layout on the disk array. The paper proposes some data distributing layout methods, of which a representative one is to arrange records, which constitute data units for reading and writing from a processing device, as is on the disk drive. In the following, such data arrangement is called a distributing layout by record. In Patterson the distributing layout by record is treated as RAID4 and RAID5. One of the advantages of the distributing layout by record is the ability to perform the read/write operation for each of the disk drives independently that form the disk array. Thus, the distributing layout method by record improves the degree to which multiple read/write operations can be performed simultaneously in the disk array, thereby enhancing the overall performance of the disk system.

Higher reliability of the disk array can be achieved by adopting a redundant configuration. In the distributing layout by record, for one data record stored in each of multiple disk drives, a parity record consisting of one record of parity data is generated and stored as one record in each disk drive. A set of a parity record and data records for which the parity record was generated is called a parity group. Normally, the records in the same parity group are stored in different disk drives. One parity group may contain two or more parity records.

When one of the data records for which a parity record was generated should fail, the contents of the failed data record can be recovered from the parity record of a parity group to which the faulty data record belongs, and from the remaining data records in the parity group. Thus, if an error occurs in any of the disk drives in which a parity group is stored, the lost data can be reinstated. Normally, by setting the number of parity records in a parity group to n, it is possible to recover data in the parity group if failures occur in up to n disk drives.

With the distributing layout by record, when the contents of a part of data records in a parity group are changed by write operation, the parity record needs to be updated. The updated value for the parity record should include, in addition to updated values for the data records being written, a set of old values, before updating, of the data records being written and of the parity record, or a set of values of the remaining data records in the same parity group to which the data records being written belong.

Acquisition of these sets of values is performed as a preprocessing prior to writing updated values into the data records that are subjected to the write operation. An overhead of the preprocessing is smaller for acquiring the former data, i.e. the old values of the data records being written and the parity record than for acquiring the latter, i.e. the values of the remaining data records in the same parity group. Hence, when a write operation takes place, the preprocessing generally acquires the old values of the data records being written and the parity record. In other words, in the conventional disk array that adopts the distributing layout by record, the data record updating procedure consists of the following operations in the order of occurrence: reading the old data records and the old parity record before being updated; generation of a parity record after the data records are updated; and writing the updated data records and the updated parity record.

In a disk array apparatus that has parity data in the distributing layout by record, when a write operation is performed, a parity record of the same parity group to which the data records being written belongs is updated. At this time, when we look at the disk drives that contain a parity record of the same parity group to which the data records being written belong, these disk drives perform a read operation to read an old value of the parity record and a write operation to write a newly generated parity data in order to update the parity record. Because the reading of the old parity data and the writing of the updated parity data are performed to the same storage medium in the disk drive, that is, on the same area on the disk, the writing of the updated parity data is done after the disk has turned at least once following the reading of the parity data.

On the other hand, as to the disk drives in which the data records that are subjected to the write operation are stored, old data record values are read out prior to writing the updated data records in order to update the parity record as well as to write the updated data records. As in the case of the parity record, the reading of the old data records and the writing of the updated data records are performed to the same area on the disk. Hence, the updated data record writing operation must wait for the disk to turn at least one time after the reading of the old data.

In this way, with the conventional disk arrays, the disk latency is essential for the data record updating operation to be carried out. For this reason, performance may be worse in some cases than that of ordinary disk drives.

SUMMARY OF THE INVENTION

It is therefore an object of the present invention to provide a disk array which has parity data in the distributing layout by record and which has no disk latency that has been essential in the conventional disk arrays in updating the parity record during the writing operation and which has an increased speed in the writing operation.

To achieve the above object, the storage system of the present invention has one or more disks as data storage mediums, wherein each of the one or more disks includes a plurality of data records. The storage system also includes a first head which reads data stored in a data record, and a second head positionable with a time delay with respect to positioning of the first head, over the data record from which the first head has read data. The second head writes data into the data record.

The present invention also includes an actuator having the first head and the second head securely mounted thereon for performing a seek operation, and an updated data generator which causes a read of data stored in the data record by using the first head, generates new data from the data thus read out, and when the second head is positioned over the data record from which the data was read out, causes a write of the new data into the data record.

The storage system of the present invention, which is connected to a processing device for storing data used by the processing device, includes a first disk drive which includes a disk having a plurality of records containing data, a first head to read data held in a record on the disk, and a second head that positions itself on the same record after a time delay with respect to the positioning of the first head and writes data into the record on the disk.

Also provided in the storage system connected to the processing device is a second disk drive which includes a disk having a plurality of records wherein at least one record contains redundant data corresponding to the data held in a same parity group of disk drives other than the second disk drive, a third head which reads redundant data held in a record on the disk, and a fourth head that positions itself over the same record after a time delay with respect to the third head. The data stored in the first disk drive is transferred to and from the processing device through data transfer apparatus.

The storage system connected to processing device also includes a controller which, when storing data received from the data transfer apparatus into a record in the first disk drive, uses the first head of the first disk drive and reads old data stored in a record into which the received data is to be written and also old redundant data stored in a record in the second disk drive and corresponding to the old data, generates new redundant data from the received data, the old data and the old redundant data, controls the first disk drive to write the received data into the record in which the old data was stored when the second head first positions itself on the record after the old data was read out, and which at the same time controls the second disk drive to write the new redundant data into the record in which the old redundant data was stored when the fourth head first positions itself over the record after the old redundant data was read out.

The controller of the present invention makes it possible to read old redundant data from a parity record by using the third head, generate new, updated redundant data from the old redundant data, and write the new, updated redundant data into the record through the use of the fourth head located in the immediate vicinity of the third head when the record in which the old redundant data was stored is first situated under the fourth head. In storage systems such as disk array apparatuses having redundant data in the distributing layout by record in which redundant records are updated during the process of data updating, it is therefore possible to write the updated redundant data immediately after the old redundant data was read out almost without a disk latency. This speeds up the data updating processing in the storage system.

BRIEF DESCRIPTION OF THE DRAWINGS

The improvements of the present invention and the advantages resulting therefrom will become apparent upon reading the following description of the preferred embodiments in light of the drawings in which like parts are designated with like numerals and in which:

FIG. 10 is a flowchart showing the flow of the write processing;

FIG. 13 is a flowchart showing the processing to write the write data;

DETAILED DESCRIPTION OF THE PREFERRED EMBODIMENTS

Figure 1:
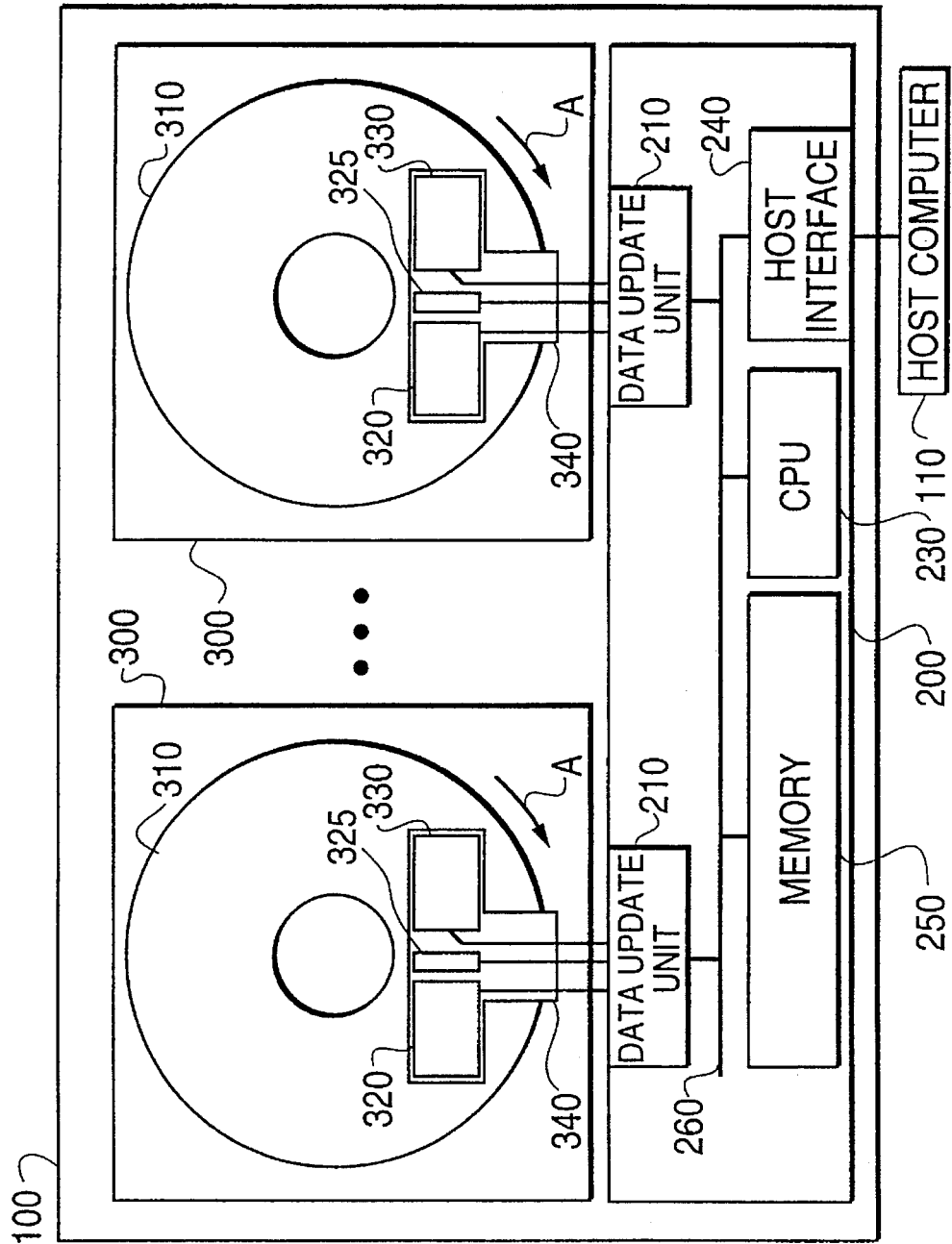
FIG. 1 illustrates an embodiment of the storage system of a first embodiment of the present invention.

FIG. 1 illustrates the construction of the first embodiment of a computer system that makes use of the present invention. In FIG. 1, reference numeral 100 represents a storage system, which includes a control unit 200 and a plurality of disk drives 300. The control unit 200 comprises data updating units 210, a CPU 230, a host interface 240 that transfers data to and from a host computer 110, a memory 250, and a bus 260 that interconnects these. The number of data updating units 210 provided is the same as the number of disk drives 300, and each of the data updating units performs read/write operations on data stored in the disk drives 300.

The disk drive 300 includes a disk 310, which is a storage medium to store data, a read head a 330 to read data recorded on the disk 310, a write head 320 to write data on the disk 310, a read head b 325 to position the write head 320, and an actuator 340 for fixing the read head a 330, read head b 325 and write head 320 and for performing a seek operation. The read head a 330 and the write head 320 are mounted on the same actuator 340 to perform the seek operation on the same track. The disk 310 turns clockwise as shown by an arrow A, and points on the disk 310 move past the read head a 330, read head b 325, and write head 320 in that order. Thus, the write head 320 can write data into the records from which the read head a 330 has read data with a slight delay without requiring the seek operation.

In this embodiment, the heads in each of the disk drives 300 for data read and write operations are dedicated for performing the reading operation or the writing operation. These heads may use a magnetoresistive (MR) head disclosed in the Nikkei Electronics (1991, 9–30, pp.87–89), for example. The MR head uses a magnetoresistive element for the read head to enhance the reading sensitivity to a higher level than that of conventional, commonly used heads.

Figure 2:
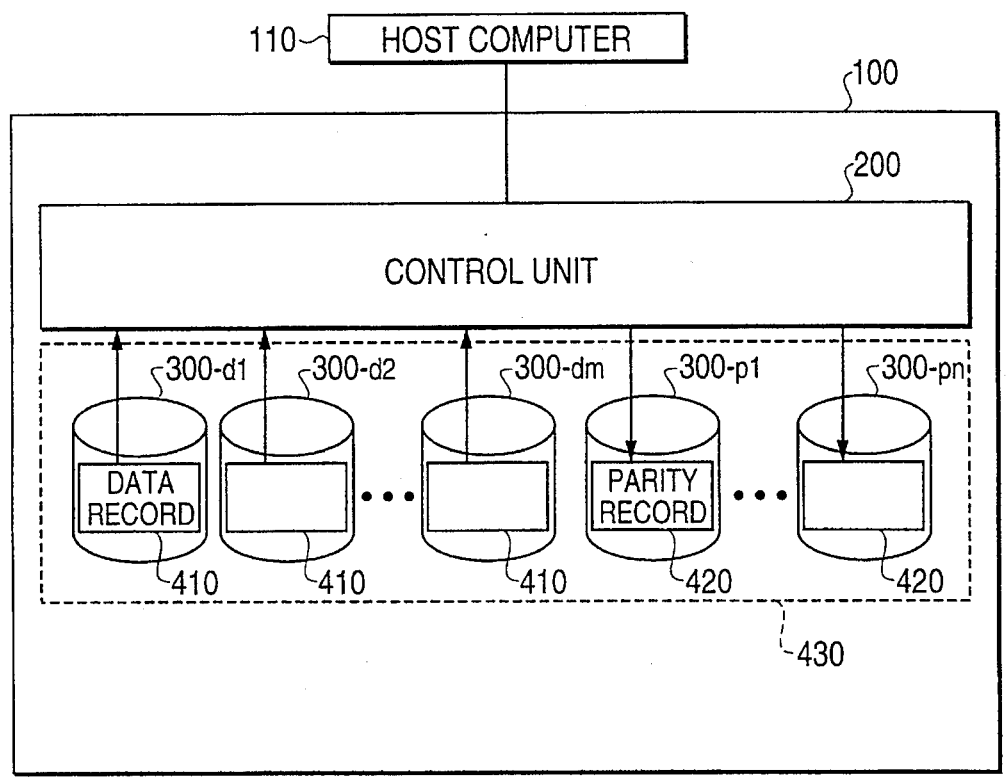
FIG. 2 illustrates a configuration of the disk array having a distributing layout by record.

The storage system 100 of this embodiment forms a disk array with the distributing layout by record and works as one disk system when seen from the host computer 110. A unit of data handled in reading and writing operations in the storage system 100 is called a record. Data is read and written to/from each disk drive 300 in units of a record. The disk drive 300, as shown in FIG. 2, includes m disk drives $300_{d1}$–$300_{dm}$ that store data records 410 containing data transferred to and from the host computer 110 and used by it, and n disk drives $300_{p1}$–$300_{pn}$ that store parity records 420 used to recover data records lost by a failure of any disk drives 300. These (m+n) disk drives 300 form one parity group. The parity data contained in each of the parity records 420 is generated from data stored in all the data records 410 in the same parity group. Generally, when the number of parity data provided in a parity group is n and if, of the (m+n) disk drives making up the parity group, up to n disk drives should fail, the contents of data records lost due to the failures of the disk drives can be recovered. To distinguish between the disk drives holding the data records 410 and those holding the parity records, the former is called a "data disk" and the latter a "parity disk" in this specification.

Figure 3:
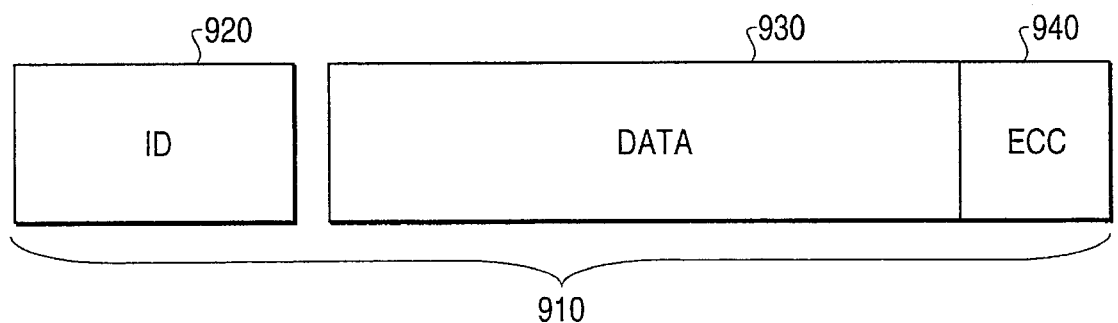
FIG. 3 illustrates a logical structure of a record in the disk.

FIG. 3 shows how records are stored in the disk 310. The disk drive 300 has a plurality of disks 310 in which to store data, and each disk 310 has a plurality of concentrically arranged tracks for holding data. Each track consists of a plurality of sectors, a minimum unit area for data access in the disk drive 300. FIG. 3 shows a logical configuration of one sector, a unit for data recording on the disk 310. A sector 910 consists of: an ID portion 920 that contains information (ID data) for identifying the sector; a data portion 930 in which to record data that is actually read or written, and an ECC portion 940 in which to record redundant data (ECC) used to correct simple read errors of data in the sector 930. The data record 410 and the parity record 420 described in FIG. 2 corresponds to the data portion 930 in the sector 910. Normally, reading data from the disk drive 300 involves, first, reading the ID portion 920 to search for a sector 910 with ID data identical with the ID data of a target sector. When a sector 910 is found which has an ID portion 920 identical with the ID data of the target sector, the data portion 930 and the ECC portion 940 are read from the sector 910. The ECC is used for checking a data match. If there is an error in data, the ECC is used to correct and recover data if the error is correctable.

The write head a 320 and the read head 330 of each disk drive 300 are mounted on the actuator 340 so that they are spaced more than one record length of the disk 310 between these heads. In more concrete terms, they are spaced a distance equal to one record length plus a distance that the disk 310 moves during a time taken to correct a correctable read error by the ECC. As described below, at time of data updating, the parity record is also updated. What is read out before writing the updated data at time of data updating includes data records to be updated and old data (old parity data) contained in the parity records in the same parity group to which the data records belong. With the read head a 330 and the write head 320 spaced in this way, it is possible to read one record of data and keep the write head 320 from being positioned over the record just read out until the check by the ECC is performed on the read data. As a result, if there is a read error during the data reading prior to the writing of updated data, it is possible to correct the data if the error is correctable and, if not, to retry the read operation before updating the contents of the record and then continue the processing. When the readout operation is performed normally, or after data is corrected if the error is correctable, the updated data can be written into that record without a delay due to a disk latency.

Figure 4:
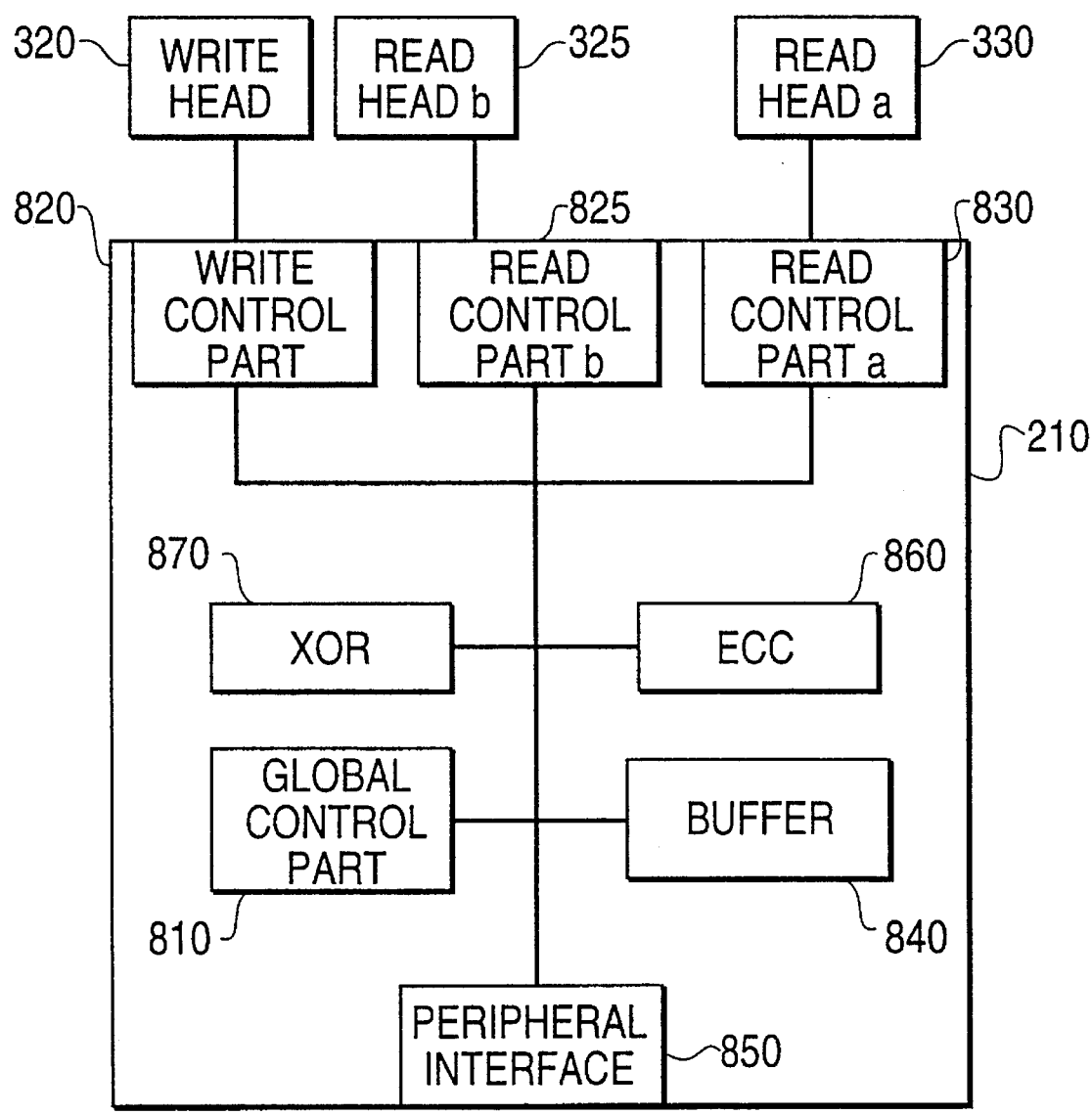
FIG. 4 illustrates the data updating unit.

The structure of the data updating unit 210 is shown in FIG. 4. The data updating unit 210 includes a peripheral interface 850 that transfers data to and from the bus 260, a global control part 810 that performs an overall processing control in the data updating unit 210, a buffer 840 that can accommodate at least three records of data, an ECC part 860 that adds ECC to the data to be written or performs error check and correction by using ECC, an XOR part 870 to perform an exclusive-OR operation as during parity record updating, a read control part a 830 that controls data reading by using the read head a 330, a write control part 820 that controls data writing into disk by using the write head 320, and a read control part b 825 that controls data reading by using the read head b 325. Control of the positioning of the read/write heads on an appropriate track by using the actuator 340 is performed by the read control part a 830. The read control part a 830 uses the read head a 330 to read the ID portion on the disk and compares it with the ID data of a target record to be read out, positions the read head a 330 on the target record, and reads data from the target record. The read control part b 825 uses the read head b 325 to read the ID portion, compares it with the ID data of a target record into which data is to be written and monitors that the write head 320 is positioned on the target record. Data is recorded serially on the disk 310 whereas the control unit 200 including the data updating unit 210 handles data parallely. For this reason, the read control part a 830 and the read control part b 825 have a function of converting serial data into parallel data. The write control part 820 has a function of converting parallel data into serial data.

Because this embodiment performs an exclusive-OR operation between data in the parity group to generate a parity record, the XOR part 870 is provided. When another method such as the Reed-Solomon method is used for generation of the parity record, the XOR part 870 is replaced with a circuit conforming to that method employed.

Figure 5:
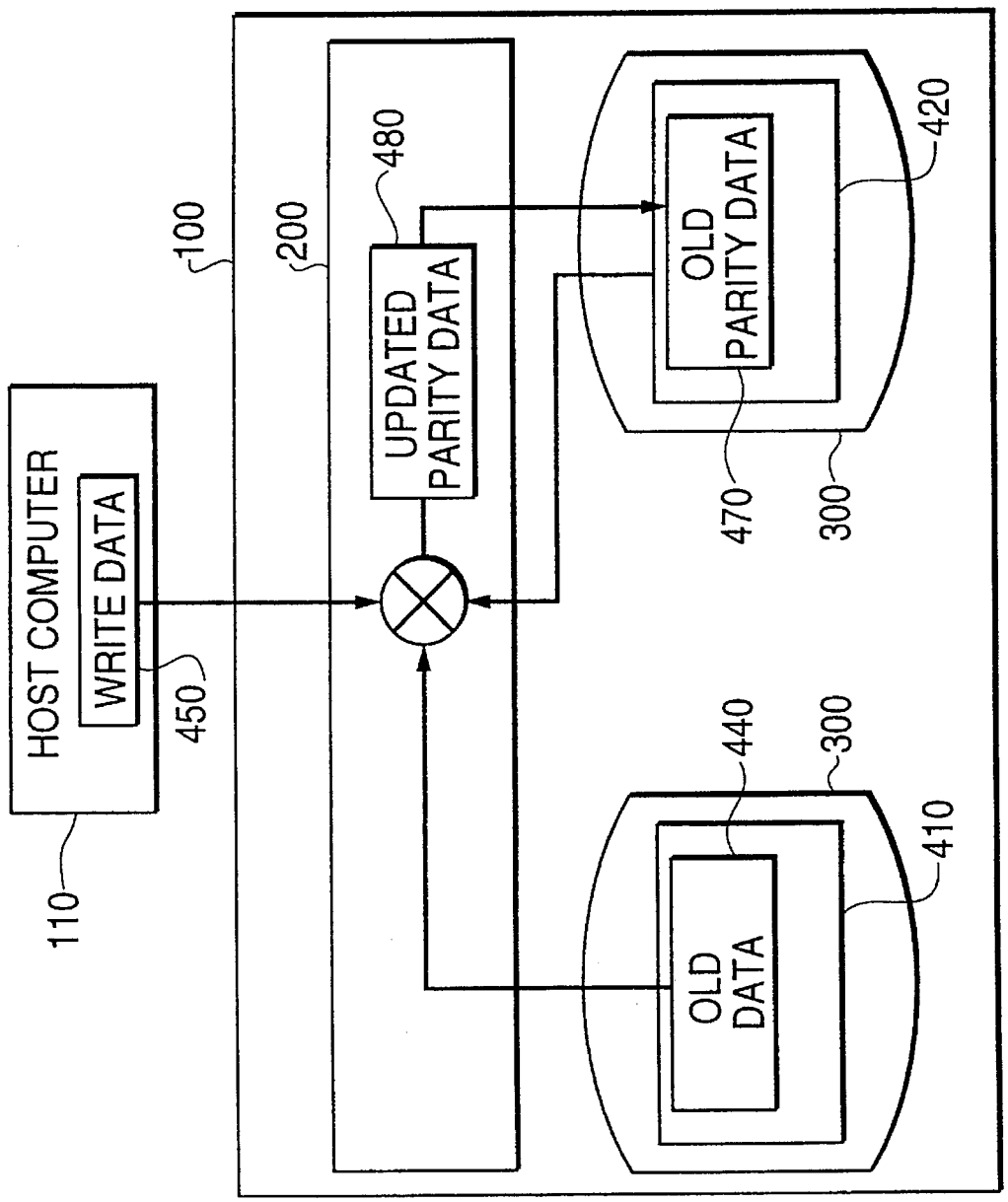
FIG. 5 is a schematic diagram showing how a parity record is updated.

FIG. 5 shows how the parity record 420 is updated. The updating of the parity record 420 is performed when the data record 410 is updated with write data 450 from the host computer 110. The updated parity data 480 to be stored in the parity record 420 is generated by using (1) old parity data 470 of the parity record 420 that corresponds to the data record 410 to be updated with the write data 450 from the host computer, (2) write data 450 from the host computer 110, and (3) old data 440 stored in the data record 410 to be updated with the write data 450. Generation of the updated parity data is performed by the XOR part 870 of the data updating unit 210 that corresponds to the parity disk containing the parity record 420 being updated, and the updated parity is stored in the parity record 420 by the write control part 820.

Before proceeding to detailed explanation of the data write operation in this embodiment, a brief description is given as to how the data updating processing can be speeded up in this embodiment. The write operations may be roughly classed into three kinds: the reading of old data stored in the data record that is subjected to the write operation, the updating of parity data, and the writing of write data. How these processings can be speeded up will be explained by looking at the data disk and parity disk.

Figure 6:
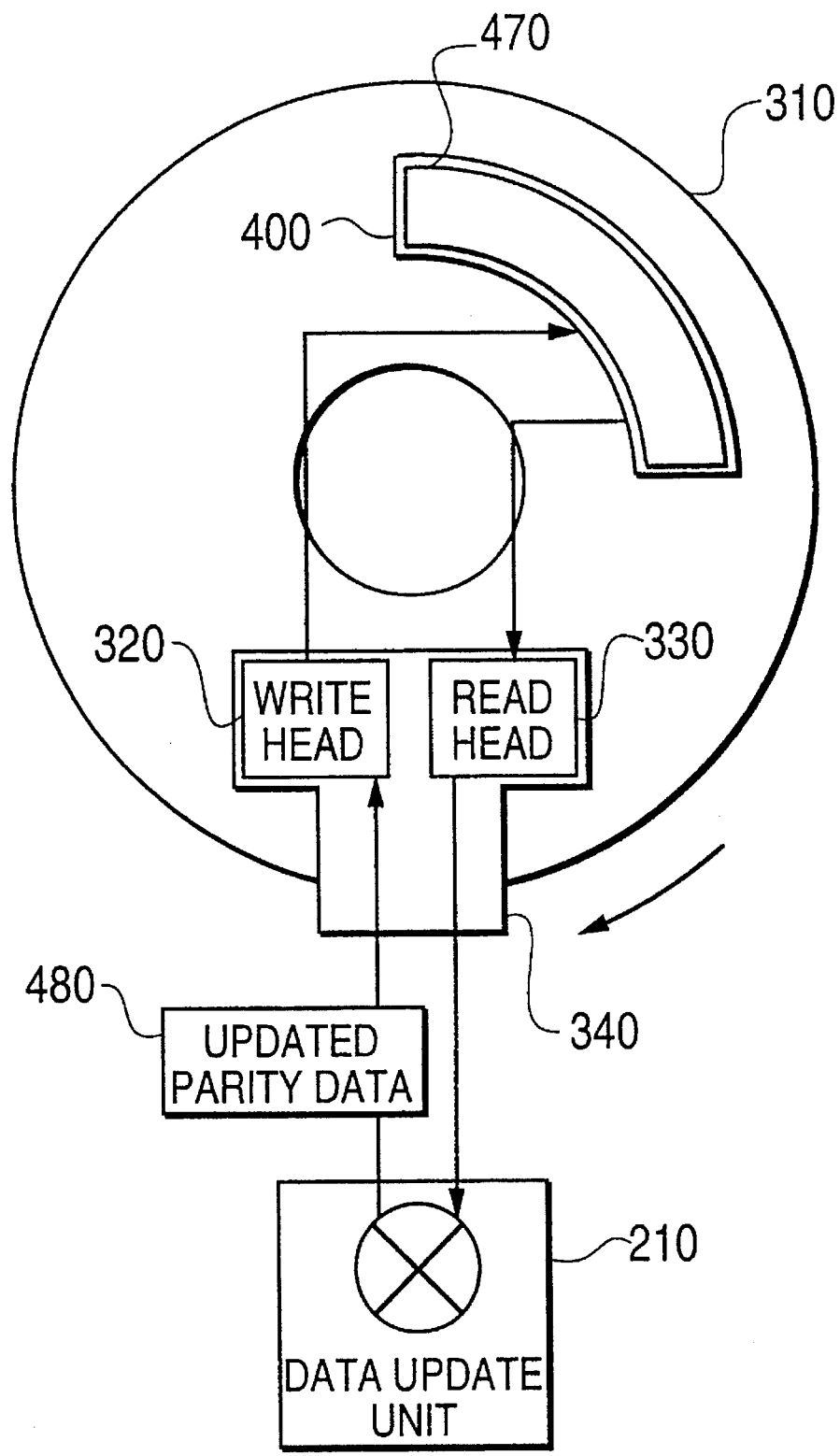
FIG. 6 is a schematic diagram showing the processing performed on the parity disk during data updating.

FIG. 6 shows the outline of processing performed on the parity disk when data is updated. The data updating unit 210 corresponding to the parity disk, first, operates the actuator 339 and read head 330 to read old parity data 470 from the parity record 420 in question. Next, using the old parity data 470 thus read out, new parity data (updated parity data) 480 is generated simultaneously with the data updating. Further, when the write head 320 is positioned over the parity record 420, the generated parity data 480 is written into the parity record 420 using the write head 320.

Figure 7:
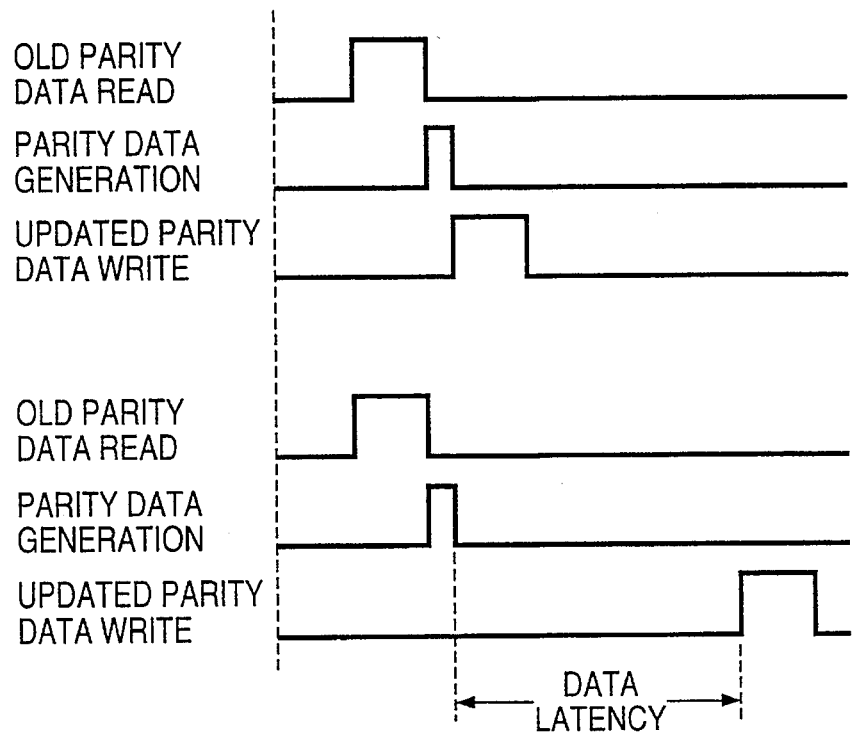
FIG. 7 is a timing chart of the parity data updating processing.

FIG. 7 shows timing charts comparing the parity data updating performed by this embodiment and that performed by the conventional method. In FIG. 7, the parity data generation timing includes a time such as required for ECC check on the old parity data read out.

As shown in FIG. 7, with the conventional disk system, after old parity data is read and updated parity data is generated, it is not possible to write the updated parity data into disk until the head is situated again on the record to be updated. With this embodiment, on the contrary, since there is an interval of more than one record length between the read head a 330 and the write head 320, as mentioned earlier, it is possible to generate the updated parity data 480 after the parity record 420 to be updated has come under the read head a 330 before it is situated beneath the write head 320, thus allowing the updated parity data 480 to be written almost without the disk latency. If in this embodiment the read control part a 830 and the write control part 820 are made to operate independently of each other to permit the read and write operations on the disk to be performed parallely, it is possible to perform in parallel the writing of the updated parity data and the reading of parity data from succeeding parity records. This ensures a more efficient updating of the contents of two or more successive parity records.

Figure 8:
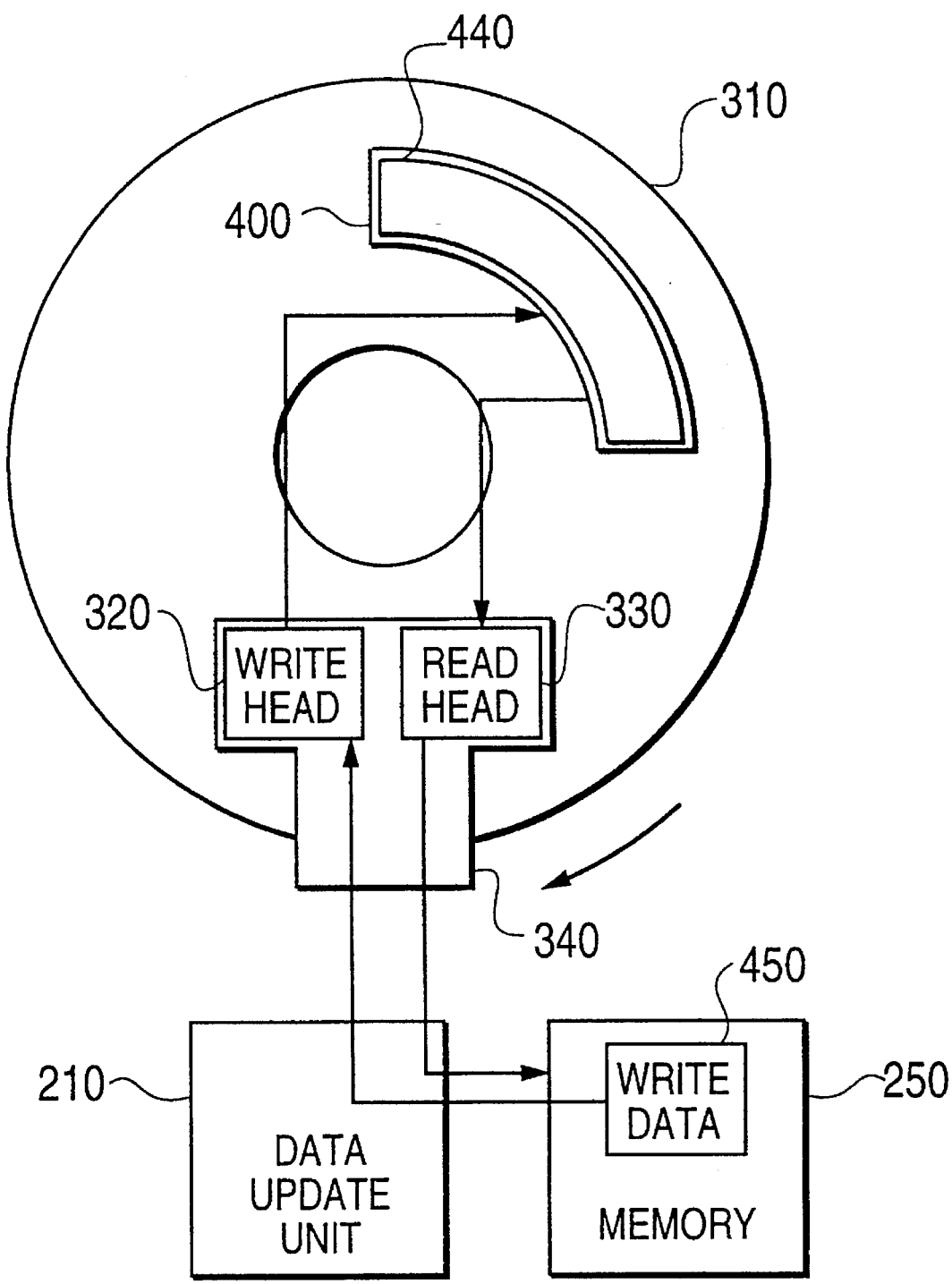
FIG. 8 is a schematic diagram showing the processing performed on the data disk during data updating.

FIG. 8 shows the outline of processing performed on the data disk when data is updated. The processing on the data disk is carried out in the same way as the processing on the parity disk. First, the data updating unit 210 operates the actuator 340 and the read head a 330 to read old data 440 from the data record 410 to be updated. Then, when the write head 320 is situated on the data record 410, write data 450 as updated data is written into the data record by using the write head 320.

Figure 9:
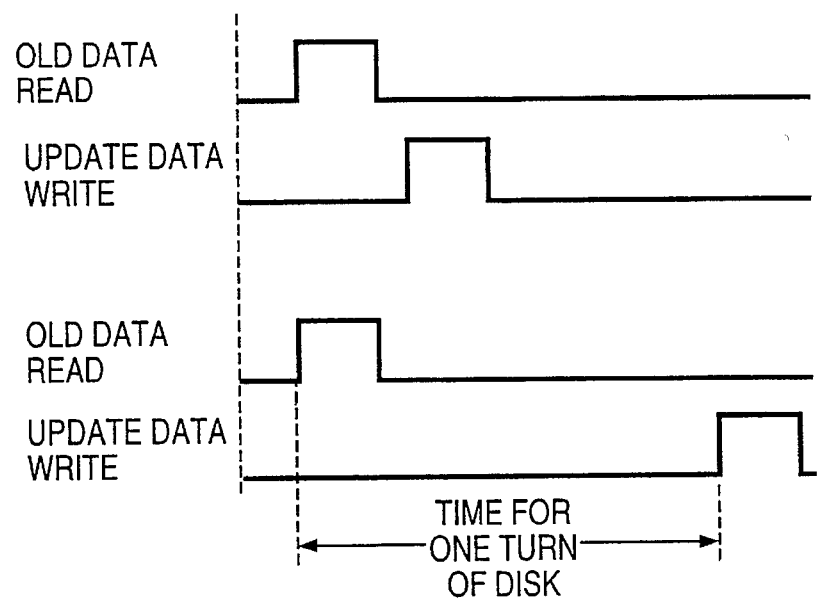
FIG. 9 is a timing chart of the data updating processing.

FIG. 9 shows timing charts comparing the data record updating performed by this embodiment and that performed by the conventional method. As shown in FIG. 9, with the conventional method, after old data is read, it is not possible to write the updated data into disk until the head is situated again on the record to be updated. With this embodiment, however, since there is an interval of more than one record length between the read head a 330 and the write head 320, as mentioned earlier, it follows that, after the data record 410 to be updated has come under the read head a 330 and the old data was read out, the write data can be written immediately when the write head 330 is positioned on the data record 410, thus allowing the updated data to be written immediately without having to wait for the disk to make one turn. This lowers the overhead. As with the updating of the parity record, if in this embodiment the read control part a 830 and the write control part 820 for the data disk are made to operate independently of each other to permit the read and write operations on the disk to be performed parallely, it is possible to perform in parallel the writing of the write data and the reading of old data from succeeding data records. This ensures a more efficient updating of the contents of two or more successive data records.

Next, the processing flow of the write operation in this embodiment will be explained in detail. FIG. 10 is a flowchart illustrating a general description of the flow of the write operation in this embodiment.

The control unit 200 receives write data and its ID data from the host computer 110 through the host interface 240 and stores them in the memory 250 (step 1010). Next, the CPU 230 hands the write data and its ID data on the memory 250 over to a data updating unit 210 that corresponds to the data disk to which these data are to be written (step 1020). Then, the contents of the data disk are updated (step 1030), and the data updating unit 210 stores into the memory 250 old data contained in the data record 410 that was updated (step 1040). The CPU 230 then performs an exclusive-OR operation on the write data 450 sent from the host computer 110 and the old data read out from the data record that was updated to produce differential data. Then, the differential data and the ID data of the parity record to be updated are handed over to the memory 250 and to the data updating unit 210 corresponding to the parity disk (step 1050). Finally, the contents of the parity disk are updated (step 1060). Now, the write operation is complete.

Figure 11:
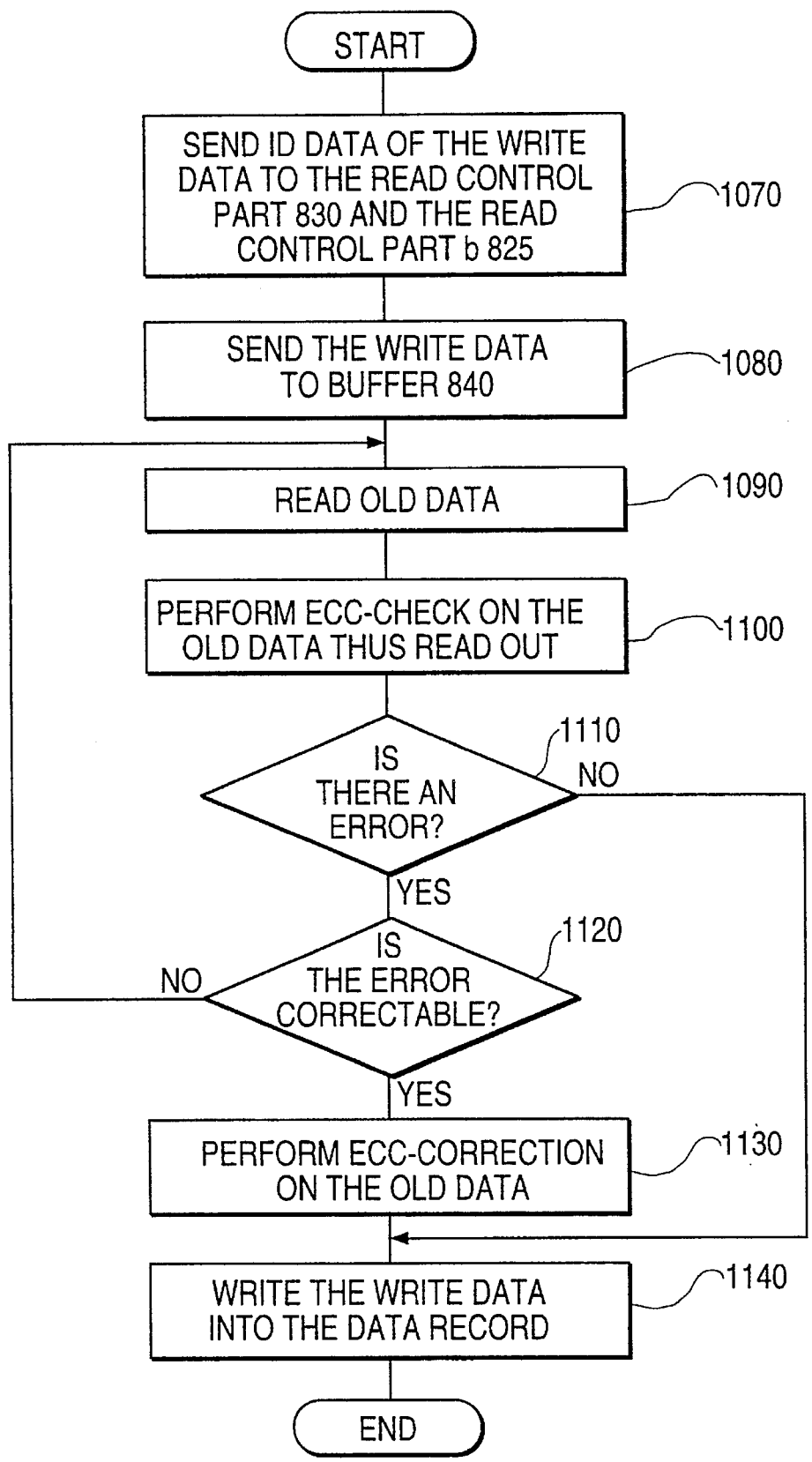
FIG. 11 is a flowchart showing the flow of processing performed by the control unit corresponding a data disk during data updating.

FIG. 11 shows a flowchart of data disk updating processing (step 1030 of FIG. 10) performed by the data updating unit 210 that corresponds to the data disk where the data record to be updated exists.

The data disk updating processing is performed as follows. First, the data updating unit retrieves from memory 230 through peripheral interface 850 ID data of the data record to which the write data is to be written and sends it to the read control part a 830 and the read control part b 825 (step 1070). Next, the unit retrieves write data from the memory 230 through the peripheral interface 850 and stores it in the buffer 840 (step 1080). The read control part a 830 reads, through the read head a 330, old data from the data record having the same ID data as it received, and then stores the old data in the buffer 840 (step 1090). The ECC part 860 performs an ECC check on the old data that the read control part a 830 stored in the buffer (step 1100). If there is no error in the data (step 1110), processing proceeds to step 1140 where the write control part 820 writes the write data held in the buffer 840 into the data record. If at step 1110 an error is found, it is checked whether the error can be corrected by ECC. When the error is found to be not correctable by ECC, the processing returns to step 1090 to read the old data again (step 1120). If the error is correctable by ECC, the ECC part 860 performs the ECC-correction on the old data read out (step 1130). Then, the data record is written with the write data (step 1140), thus completing the data disk updating processing.

Figure 12:
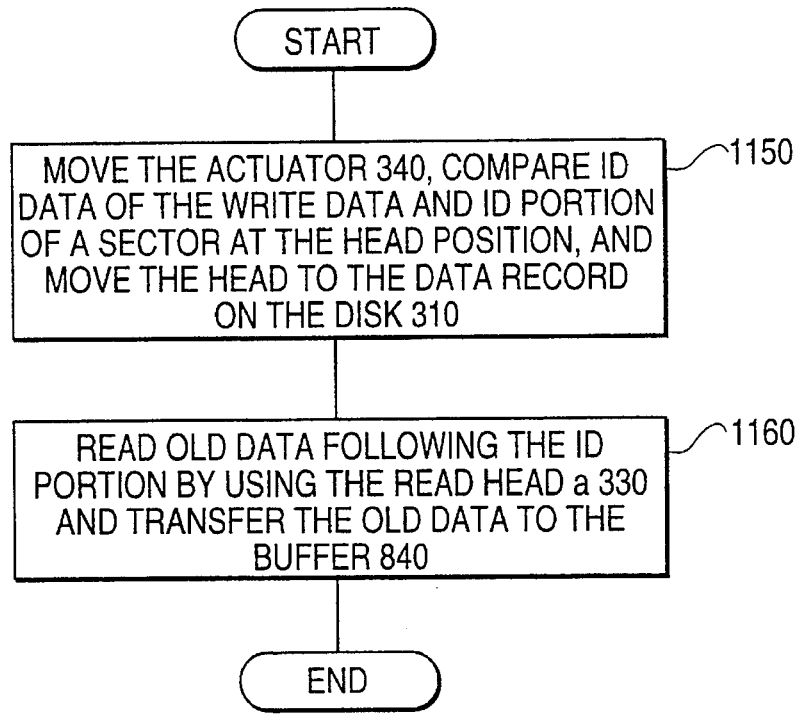
FIG. 12, is a flowchart showing the processing to read the old data.

FIG. 12 is a flowchart illustrating the flow of the read processing (step 1090) of FIG. 11. The read control part a 830 controls the actuator a 340 to move the read head a 330 to read ID data of the ID portion 920 of a data record on the disk 310. It then compares the ID data of the ID portion 920 with the ID data of the write data to position the read head a 330 on a data record 410 on the disk 310 that is to be written (step 1150). When a data record 410 with identical ID data is found, the read control part a 830 uses the read head a 330 to read out subsequent data (old data) following the ID portion and ECC, and stores them in the buffer 840 (step 1160).

FIG. 13 is a flowchart illustrating the flow of the write processing (step 1140) of FIG. 11. The read control part b 825 uses the read head b 325 to read ID data held in the ID portion 920 of the data record situated below the head on the disk 310. The read control part b 825 compares this ID data and the ID data of the write data and waits for the write head 320 to be positioned on the data record that is to be written with the write data (step 1170). With the data record to be updated situated below the write head 320, the read control part a 825 sends an interrupt to the global control part 810 (step 1180). Upon receiving the interrupt, the global control part 810 issues a write request to the write control part 820 (step 1190). Then, the ECC part 860 generates an ECC corresponding to the write data and sends it to the write control part 820 (step 1200). As a final step, the write control part 820 uses the write head 320 to write the write data along with the ECC into the data record in question (step 1210).

Figure 14:
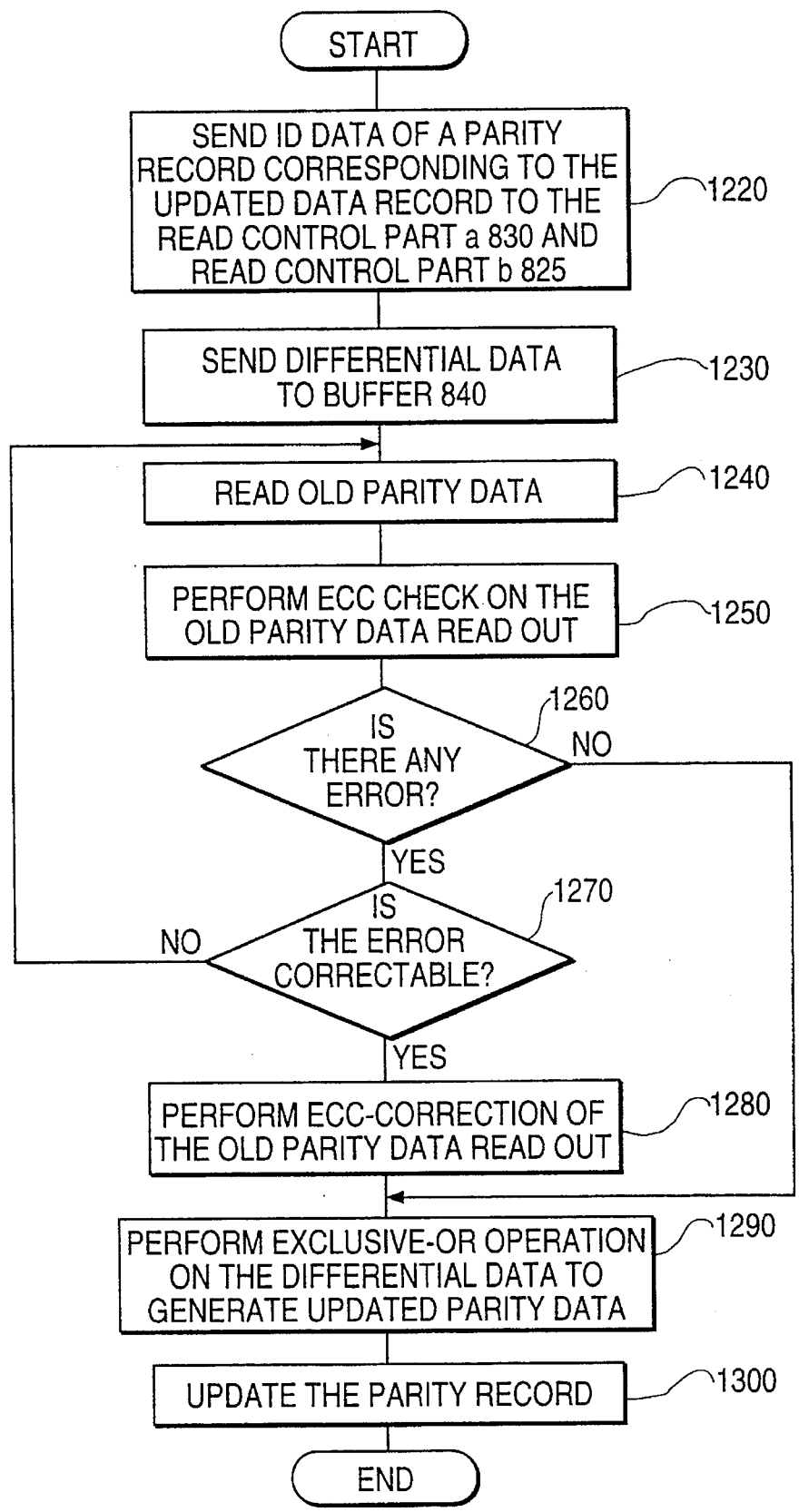
FIG. 14 is a flowchart showing the flow of processing performed by the control unit corresponding to a parity disk during parity updating.

Next, the parity disk updating processing (step 1060 of FIG. 10) will be described. FIG. 14 shows a flowchart of processing performed by the data updating unit 210 that corresponds to the parity disk.

The parity disk updating processing is performed as follows. The data updating unit first receives through the peripheral interface 850 ID data of a parity record 420 which corresponds to the updated data record 410, and sends it to the read control part a 830 and the read control part b 825 (step 1220). Next, the data updating unit receives differential data through the peripheral interface 850 and stores it in the buffer 840 (step 1230). Then, it reads old parity data (step 1240), and then the ECC part 860 performs an ECC check on the old parity data thus read out (step 1250). If there is no error in the parity data (step 1260), the processing proceeds to step 1290. If the parity error read out has an error, it is checked whether the error can be corrected by the ECC. When the error is found to be not correctable by the ECC, the processing returns to step 1240 to read the old parity data again (step 1270). When the error is found to be correctable by the ECC, the ECC part 860 performs the ECC correction (step 1280). Then, at step 1290, the XOR part 870 performs an exclusive-OR operation on the differential data and the old parity data to generate updated parity data (step 1290). Finally, the generated parity data is written into the parity record. Now the parity updating processing is complete (step 1300).

Figure 15:
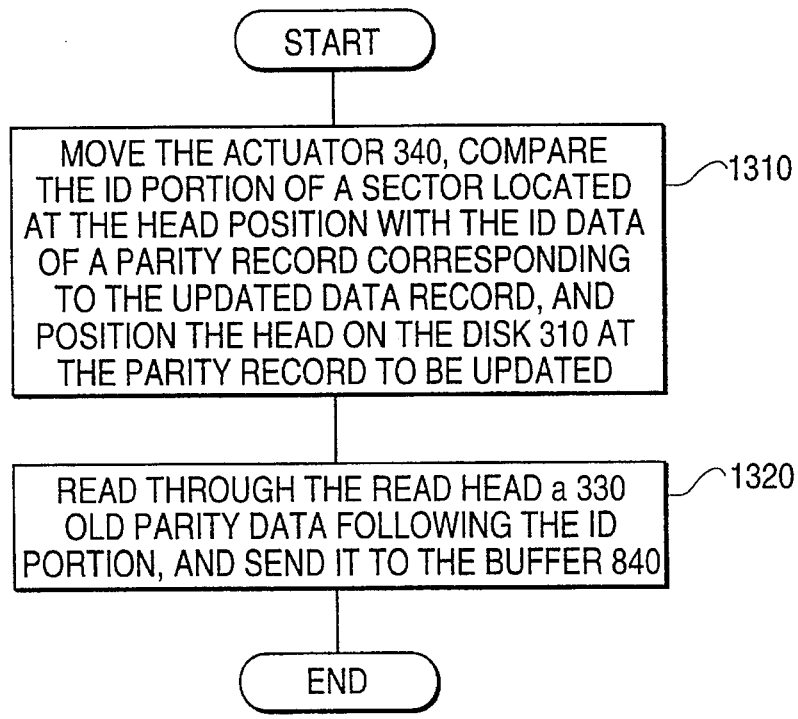
FIG. 15 is a flowchart showing the flow of processing to read the old parity data.

FIG. 15 shows a flowchart of the old parity data read processing (step 1240) of FIG. 14. The reed control part a 830 controls the actuator a 340 to move the read head a 330 to read ID data held in ID portion 920 of a parity record on the disk 310. Then, it compares the ID portion 920 of a sector located at the head position with the ID data of a parity record corresponding to the updated data record (i.e. the ID data of a parity record in the same parity group that contains the updated data record) and positions the read head a 330 on the disk 310 at the parity record to be updated (step 1310). When the desired parity record 420 with identical ID data is found, the read control part a 830 reads through the read head a 330 data following the ID portion (old parity data) and ECC and stores them in the buffer 840 (step 1320).

Figure 16:
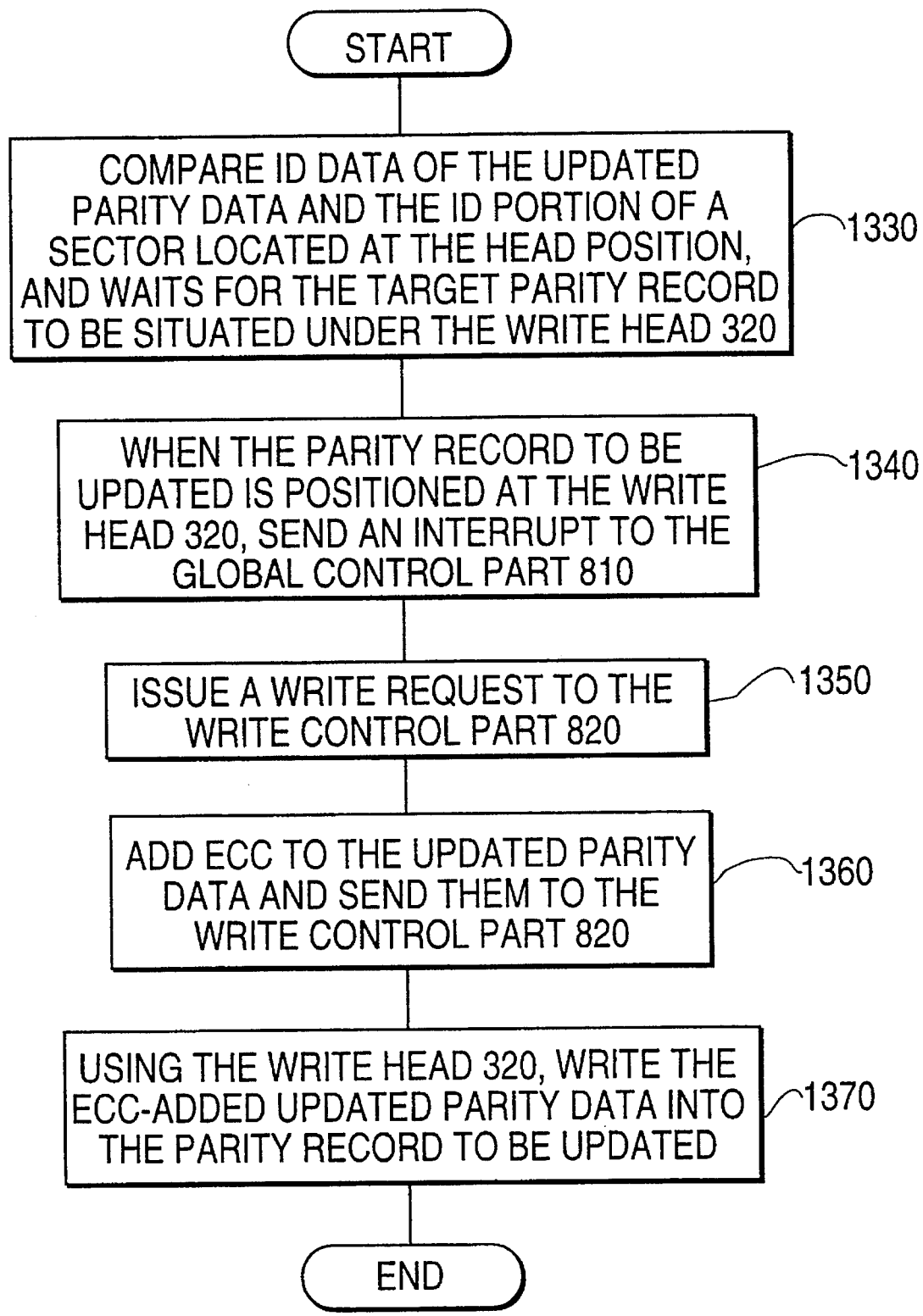
FIG. 16 is a flowchart showing the flow of processing to write the updated parity data.

FIG. 16 shows a flowchart of the parity record updating processing (step 1300) of FIG. 14. The read control part b 825 reads through the read head b 325 the ID data of a parity record located at the head position and compares it with the ID data of the updated parity data and waits for the write head 320 to be situated at the parity record to be updated (step 1330). Next, when the parity record to be updated comes beneath the Write head 320, the read control part a 825 sends an interrupt to the global control part 810 (step 1340). Upon receiving the interrupt, the global control part 810 issues a write request to the write control part 820 (step 1350). Then the ECC part 860 generates an ECC corresponding to the updated parity data and sends them to the write control part 820 (step 1360). Finally, the write control part 820 writes through the write head 320 the updated parity data and ECC into the parity record to be updated (step 1370).

As described above, in updating data in the disk array apparatus, this embodiment permits the reading of old data and parity data and the writing of updated data and parity data, both required for parity data updating, to be performed within a time it takes for the disk to make one turn. This eliminates the disk latency, increasing the speed of the data updating processing.

With this embodiment, in the process of parity record updating, the data updating unit 210 takes an exclusive-OR between the differential data generated by the CPU 230 and the old parity data read out from the corresponding parity disk to generate the updated parity data. Rather than generating the differential data by the CPU 230, it is possible to have the data updating unit 210 corresponding to each parity disk generate the updated parity data directly from the old data read from the data disk, the write data received from the host computer 110 and the old parity data. In this case, at the step 1050 of FIG. 10 the CPU 230 hands the write data and the old data to the data updating unit 210 without taking an exclusive-OR of these data. Further, at step 1230 of FIG. 14, the data updating unit 210 receives the old data and the write data, instead of the differential data, through the peripheral interface 850 and stores them in the buffer 840. Also at step 1290, the XOR part 870 takes an exclusive-OR between the old data and write data stored in the buffer 840 and the old parity data read from the corresponding parity disk in order to generate a new parity data.

While this embodiment provides an interval of more than one record length between the read head and the write head oh the disk, the interval may be narrowed. By narrowing tho interval between the read head and the write head to almost none, it is possible to eliminate a read head that this embodiment uses to position the write head. In that case, when the ECC check detects a read error, even if it is a correctable one, the writing of updated parity data involves a disk latency because the record in question moves past the write head while the error correction is made. When an uncorrectable read error occurs and the lost data is the old data read from the data disk, it is not possible to read the old data from the disk again because the data record in question is written with updated data. Under such a situation, however, new parity data can still be generated by reading data from all data records (except for the updated data record) in the same parity group as the updated data record, and taking an exclusive-OR between these data and the write data sent from the host computer. If the destroyed data is the old parity, the similar steps can be taken to generate new parity data.

In the process of updating data in the disk array apparatus, the first embodiment described above permits the reading of old data and parity data and the writing of updated data and parity data, both required for parity data updating, to be performed within a time it takes for the disk to make one turn. This eliminates the disk latency, increasing the speed of the data updating processing.

Figure 17:
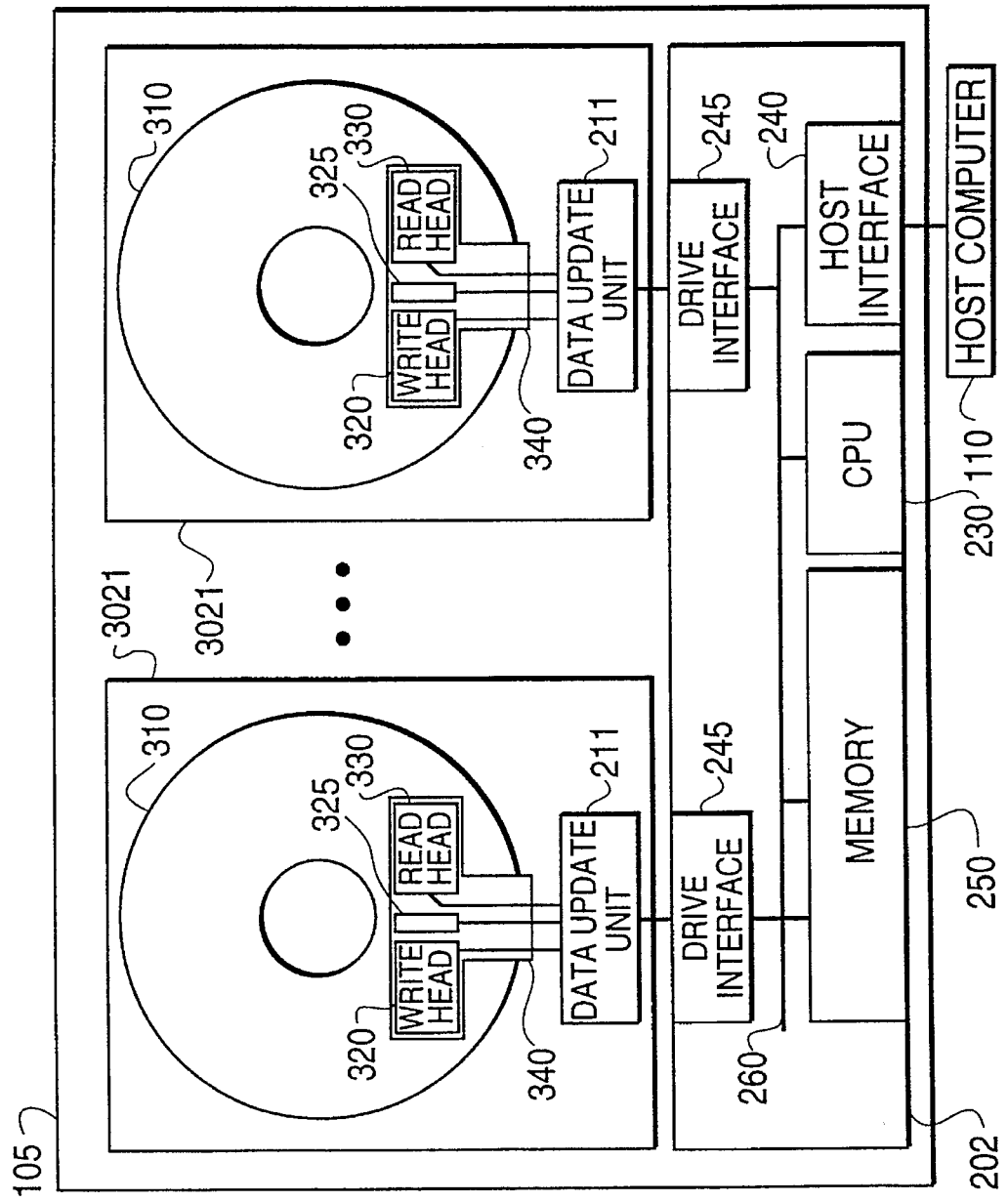
FIG. 17 is a storage system of a second embodiment of the present invention.

FIG. 17 shows a computer system which makes use of the second embodiment of the present invention. The storage system 105 of the second embodiment is basically the same in configuration as the first embodiment and includes a control unit 202 and a plurality of disk drives 3021. The configurations of the control unit 202 and the disk drives 3021 partly differ from those of the control unit 200 and the disk drives 300 of the first embodiment. The point in which the control unit 202 differs from the control unit 200 used in the first embodiment is that it has a drive interface 245 for each disk drive in place of the data updating unit 210. The disk drive 3021 is provided with a data updating unit 211 which corresponds to the data updating unit 210 of the first embodiment. The drive interfaces 245 provided in the control unit 202 perform data transfer to and from the associated disk drives 3021, the transferred data including read/write data and differential data used for parity data generation. The data updating unit 211 has a similar configuration to the data updating unit 210 of the first embodiment and connects to the associated drive interface 245 through a peripheral interface.

The configurations of other parts of the second embodiment not described above, i.e. fundamental configurations such as data distribution layout in the disk array, are similar to those of the first embodiment, and therefore their explanation will be omitted. In FIG. 17, components identical with those of the first embodiment are assigned the same reference numerals as used in FIG. 1.

Figure 18:
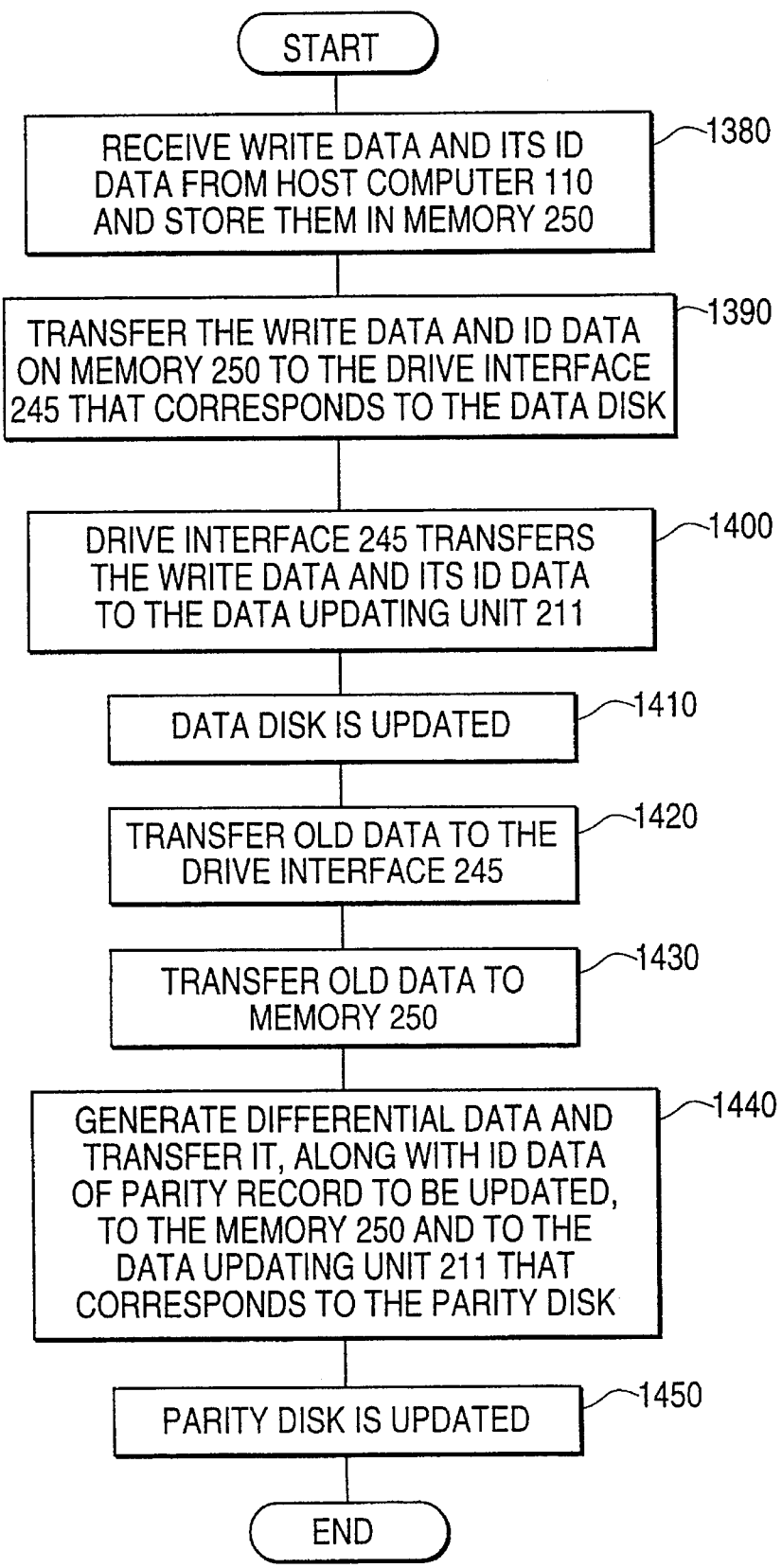
FIG. 18 is a flowchart showing the data updating processing performed in the second embodiment.

FIG. 18 is a flowchart of the write processing in the second embodiment. The control unit 202 receives, from the host computer 110 through the host interface 240, write data and information on storage location on disk 310 in which to write the write data (ID data) and then stores them in memory 250 (step 1380). Next, the CPU 230 transfers the write data and ID data stored in the memory 250 to the drive interface 245 that corresponds to the data disk 3021 where the write data is to be written (step 1390). The drive interface 245 hands the write data and ID data to the data updating unit 211 of the corresponding disk drive 3021 (step 1400). The data updating unit 211 then updates the data disk 3021 with the received write data and ID data (step 1410). Further, the data updating unit 211 transfers to the drive interface 245 through the peripheral interface old data that had been held in the data record into which the write data was written (step 1420). The drive interface 245 stores the old data received from the updating unit 211 into the memory 250 (step 1430). Next, the CPU 230 performs an exclusive-OR operation on the write data and the old data, stored in the memory 250, to generate differential data 460 and transfers it, together with the ID data of the parity record to be updated, to the data updating unit 211 through the drive interface 245 associated with the parity disk (step 1040). At the final step, the parity disk is updated and now the write operation is complete (step 1450).

Of these processings described above, the data disk updating (step 1410) and the parity disk updating (step 1450) are perform in the similar way to the data disk updating (stop 1030) and parity disk updating (step 1060) in the first embodiment, which were explained by referring to FIGS. 11 through 16. Hence, detailed description is omitted here.

Unlike the first embodiment, the second embodiment has a data updating unit inside each disk drive. This configuration makes it possible to assign the disk drive with processings which require a fine timing control, such as writing updated data (or updated parity data) into a data record (or parity record) immediately after data (or parity data) has been read out from the disk. This in turn alleviates the load of control on the part of the control unit.

As in the first embodiment, the second embodiment may also send the old data and the write data received from the host computer 110 to the parity disk, without generating the differential data by the CPU 230 in the control unit. In this case, updated parity data is generated by the data updating unit 211 in the parity disk from the write data, old data and old parity data.

Further, like the first embodiment, in the second embodiment it is also possible to reduce the interval between the read head a 330 and the write head 320 on the disk to less than one record length.

Figure 19:
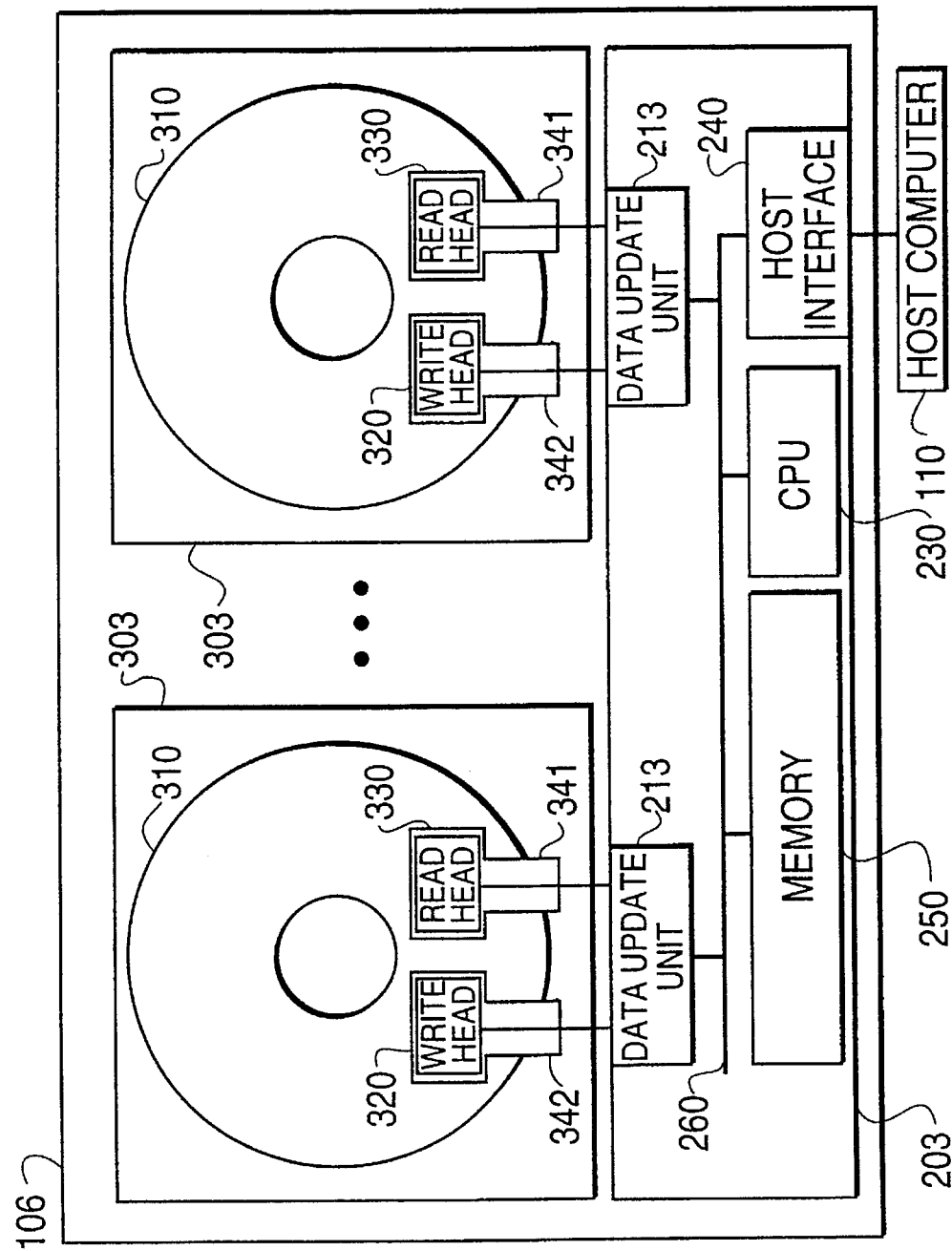
FIG. 19 is a storage system of a third embodiment of the present invention.

FIG. 19 shows a computer system that makes use of a third embodiment of the present invention. While in the first and second embodiments, the read head and the write head in the disk drive are mounted on a single actuator, the third embodiment has the read head and the write head provided on independent actuators.

The computer system of the third embodiment, as in the first and second embodiments, includes a host computer 110 and a storage system 106 connected to it. The disk drive 303 in the storage system 106 has two independent actuators 343 and 342. The actuator 341 is provided with a read head 130 mainly to read data from records on the disk 310. The actuator 342, on the other hand, has a write head 320 mainly to write data into records on the disk 310.

Figure 20:
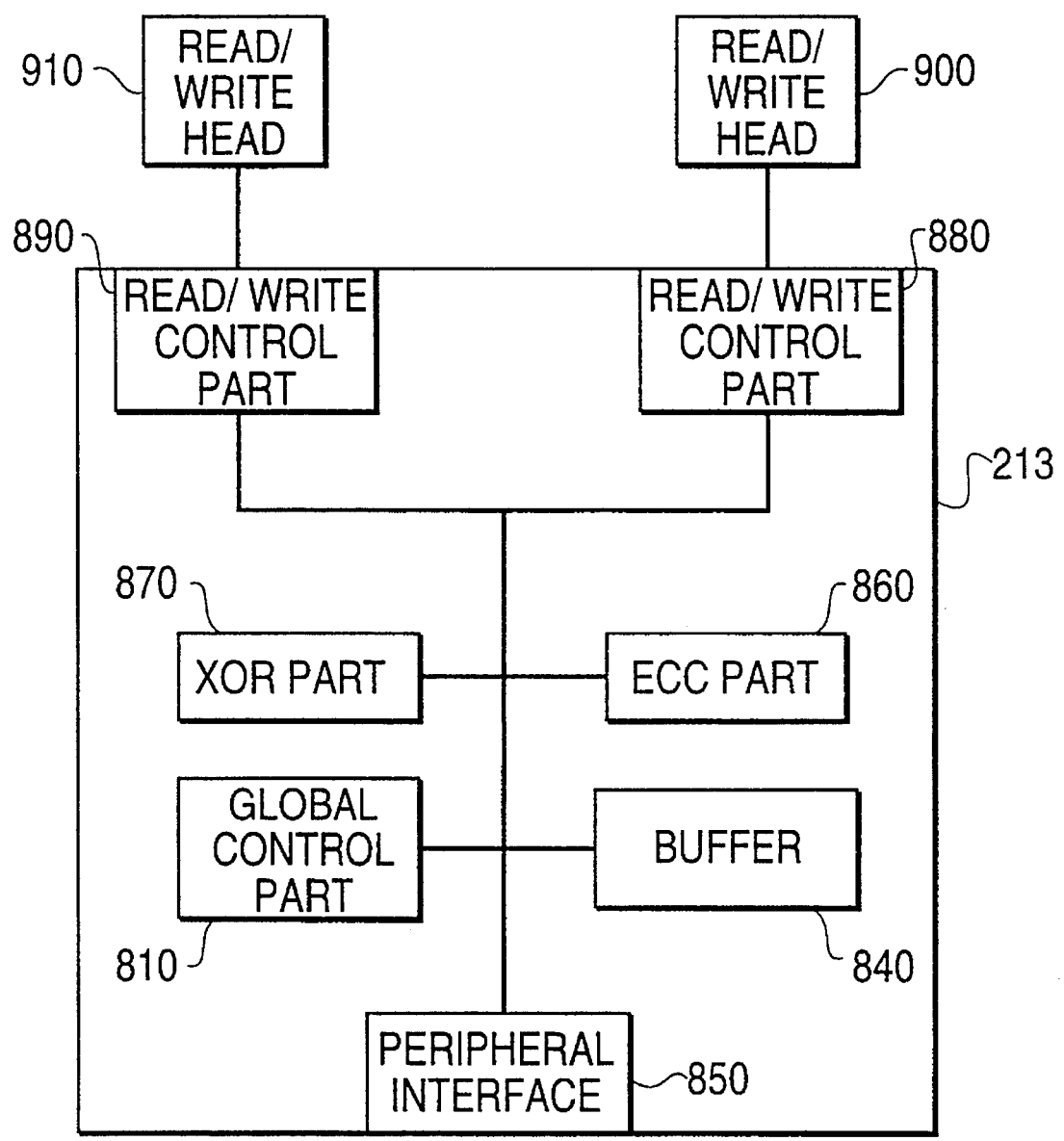
FIG. 20 is a data updating unit.

Since the third embodiment has the read head 330 and the write head 320 of the disk drive 303 mounted on the independent actuators, the configuration of the control unit 203, particularly of the data updating unit 213, differs from that of the first embodiment. FIG. 20 shows the configuration of the data updating unit 213.

In FIG. 20, the read/write control part 880 controls the actuator 341 to move the read/write head 900 to read ID portions of records, compares the ID data thus read out with ID data of a target record to be read out, and positions the head on the target record to read data (including ECC) from the record. The read/write control part 890 controls the actuator 342 to move the read/write head 910 to read ID portions of records, compares the ID data thus read out with ID data of a target record to be written into, and watches the target record position itself under the read/write head 910. Using the read/write head 910, the read/write control part writes data (including ECC) into the target record. The read/write control parts 880 and 890 control the actuators 341 and 342 so that the read/write heads 900 and 910 both seek the same track position during the process of data updating.

For the same reason as in the first embodiment, in the third embodiment the read/write control part 880 and read/write control part 890 have the serial/parallel conversion function.

The third embodiment uses a head that can perform read and write operations (read/write head 910) as a head for writing data, eliminating the need for the read head used to position the write head. The read/write head 900 and the read/write control part 880 may use a head and a control part dedicated for data reading and without a data write function.

The write processing in the third embodiment is performed in almost the similar manner to that of the first embodiment. There are, however, some differences in the old data reading processing, the write data writing processing, the old parity data reading processing, and the parity record updating processing. Flowcharts of these processings performed in the third embodiment are shown in FIGS. 21 through 24. The processings shown in FIGS. 21 to 24 correspond to the processings shown in FIGS. 12, 13, 15 and 16 explained in the first embodiment. The processings shown in FIGS. 10, 11 and 14 of the first embodiment can be applied to the third embodiment if the read control part a 830 is read as the read/write control part 880 and the write control part 820 as the read/write control part 890. Therefore, in the following description, explanation will be given for the processings shown in FIGS. 21 to 24 while processings commonly with the first embodiment are not described.

Figure 21:
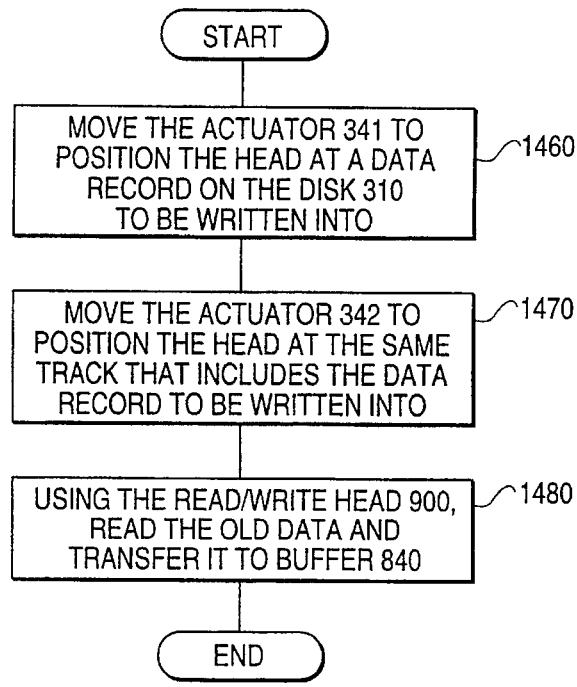
FIG. 21 is a flowchart showing the processing to read the old data.

FIG. 21 is a flowchart showing the processing to read the old data, as performed in the third embodiment. First, the read/write control part 880 controls the actuator 341 to move the read/write head 900 to a data record on the disk 310 to which the data is to be written (step 1460). At this time, the read/write control part 890 likewise controls the actuator 342 to locate the read/write head 910 at the same track position as a track containing the data record on which the read/write head 900 is positioned (step 1470). The read/write control part 880, when it finds a data record to which the data is to be written, reads old data (including ECC) stored in the data record by using the read/write head 900 and stores it in the buffer 840 (step 1480).

Figure 22:
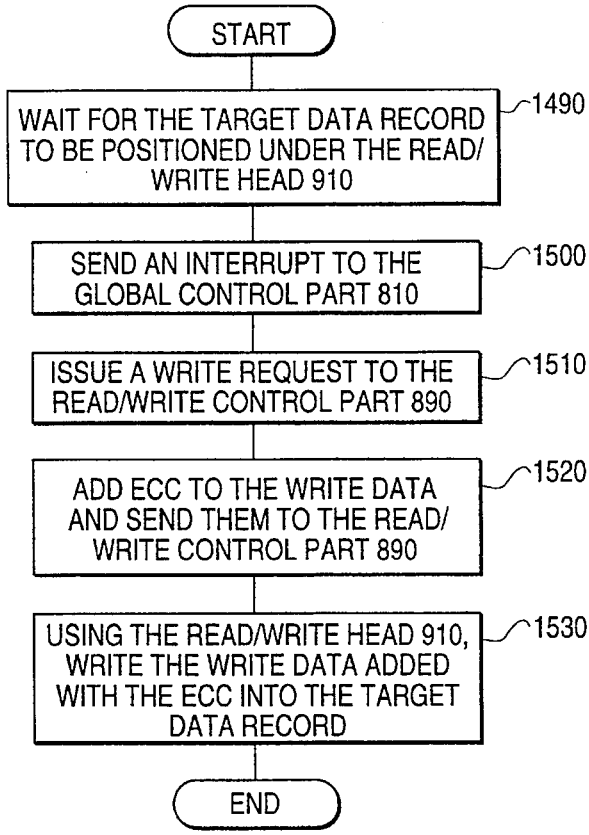
FIG. 22 is a flowchart showing the processing to write the write data.

FIG. 22 is a flowchart showing the processing to write the write data, as performed in the third embodiment. First, the read/write control part 890 waits for the read/write head 910 to be situated at a target data record into which data is to be written (step 1490). When the real/write head 910 is positioned on the target record, the read/write control part 890 sends an interrupt to the global control part 810 (step 1500). Upon receiving the interrupt, the global control part 810 issues a write request to the read/write control part 890 (step 1510). At this time, the ECC part 860 generates an ECC to be added to the write data and sends it along with the write data to the read/write control part 890 (step 1520). Finally, the read/write control part 890 writes the write data added with the ECC into the target data record 410 by using the read/write head 910 (step 1530).

Figure 23:
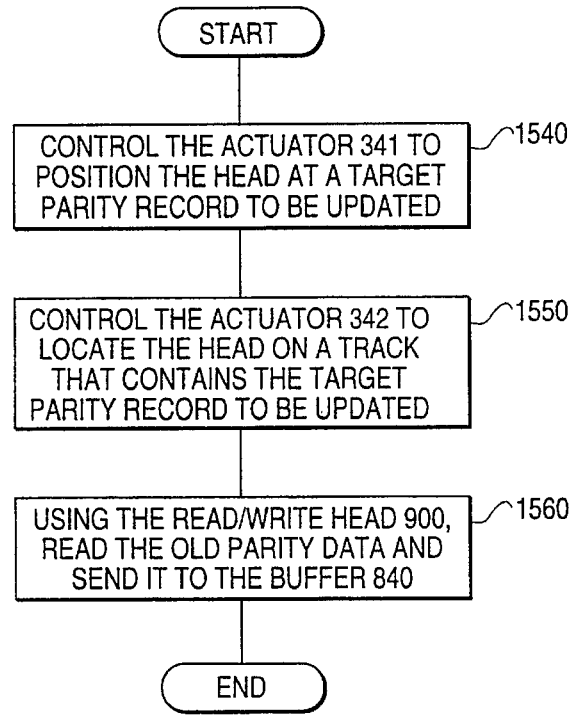
FIG. 23 is a flowchart showing the processing to read the old parity data.

FIG. 23 is a flowchart showing the processing to read the old parity data, as performed in the third embodiment. The read/write control part 880 controls the actuator 341 to locate the read/write head 900 at a corresponding parity record in the same parity group as the updated data record of the data disk (step 1540). At this time, the read/write control part 890 likewise controls the actuator 342 to locate the read/write head 910 at the same track that contains the parity record on which the read/write head 900 is situated (step 1550). Then, the read/write control part 880, when it detects the target parity record, reads the old parity data (including ECC) contained in the parity record by using the read/write head 900 and stores them in the buffer 840 (step 1560).

Figure 24:
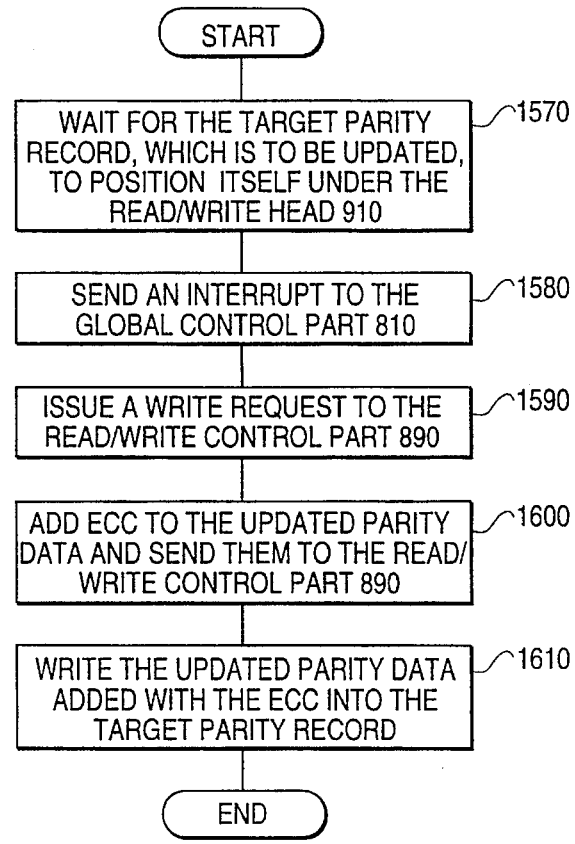
FIG. 24 is a flowchart showing the processing to write the updated parity data.

FIG. 24 is a flowchart showing the processing to write the updated parity data, as performed in the third embodiment. The read/write control part 890 waits for the target parity record, which is to be updated, to position itself under the reed/write head 910 (step 1570). The read/write control part 890, when the read/write head 910 is situated in its position, sends an interrupt to the global control part 810 (step 1580). Upon receiving the interrupt, the global control part 810 issues a write request to the read/write control part 890 (step 1590). The ECC part 860 generates an ECC to be added to the updated parity data and sends it along with the updated parity data to the read/write control part 890 (step 1600).

Finally, the read/write control part 890 writes the updated parity data added with the ECC into the target parity record by the read/write head 910 (step 1610).

The third embodiment described above may use conventional, commonly used read/write heads. It is also possible to use the same read/write heads and data updating units for both data (or parity-data) writing and reading operations, thereby reducing the kinds of constitutional parts.

In the foregoing, the processings that differ from those of the first embodiment have been described. The third embodiment may also adopt basically the same modifications as employed in the first embodiment. For example, rather than generating the differential data by the CPU 230 in the control unit, it is possible to send the old data and the write data from the host computer 110 to the parity disk. In this case, the data updating unit in the control unit corresponding to the parity disk generates updated parity data from the write data, old data and old parity data.

Figure 25:
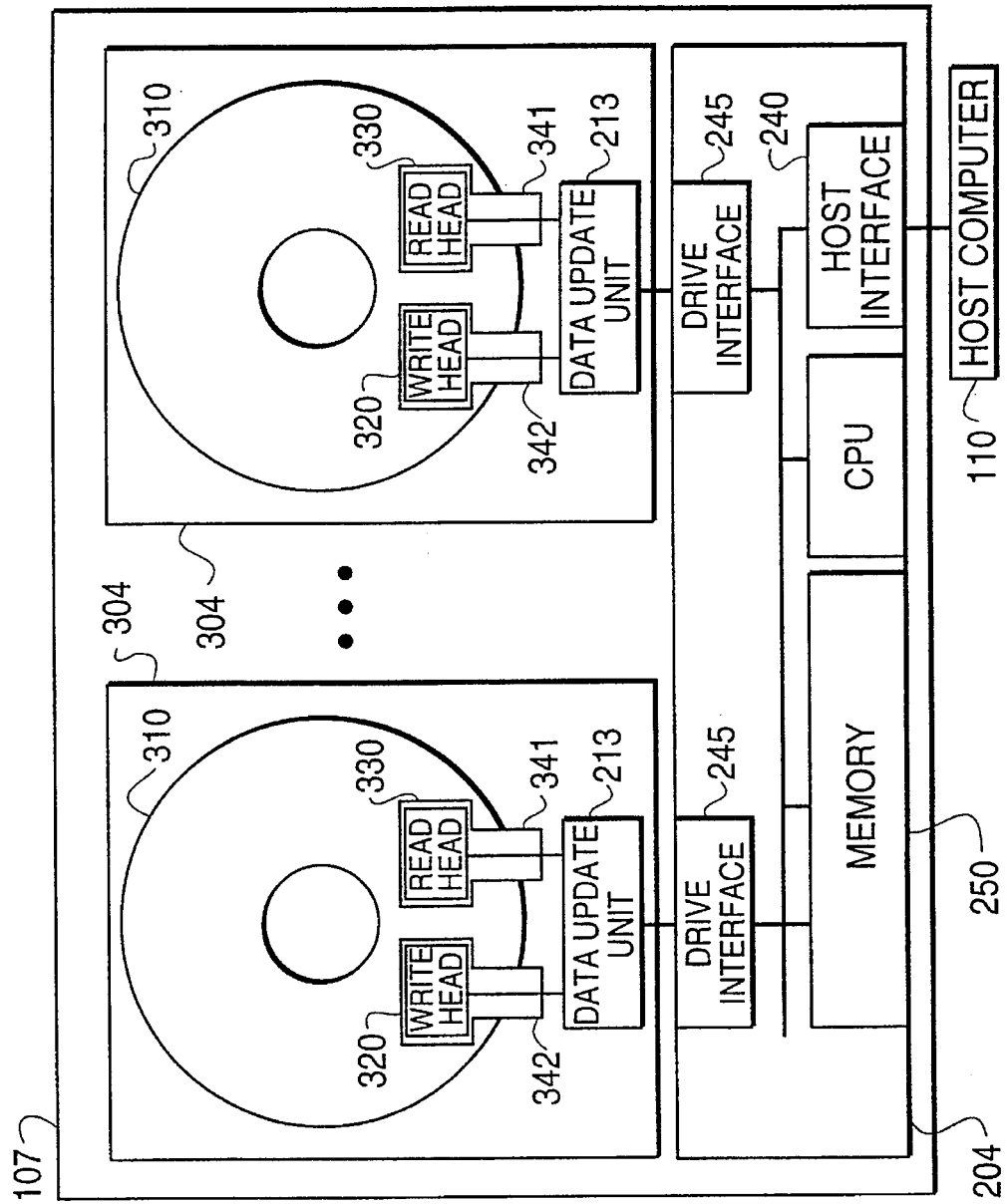
FIG. 25 is a storage system of a third embodiment of the present invention.

To facilitate the control for data updating performed by the control unit, it is possible to provide a drive interface in the control unit and install the data updating unit in each disk drive. The configuration of the computer system in this case is shown in FIG. 25. In FIG. 25, the drive interface 245 is similar to that of the second embodiment, and the data updating unit 213 is also similar to that shown in FIG. 20. As to other components, identical reference numerals are given to the components in FIG. 25 that have the same functions as those shown in FIG. 1, 17 and 19. The operations of the components shown in FIG. 25 are similar to those of the preceding embodiments, and their processings are also performed in the same way as in the preceding embodiments. Thus, their explanations are omitted.

In a storage system including disk drives each consisting of a plurality of data records for storing data, when stored data is updated by generating new data from old data and writing the generated data into the same data record in which the old data was stored, this invention allows high-speed execution of this processing by reducing overhead of disk latency. Particularly in the disk array apparatuses which have redundant data in the distributing layout by record and which require the redundant data to be updated during the data updating, the write operation can be speeded up.

Although the present invention has been illustrated and described with respect to preferred embodiments thereof, it should be understood by those of ordinary skill in the art that the forgoing and various other changes, omissions and additions may be made therein and thereto without departing from the spirit and scope of the invention.

We claim:

1. A storage system having one or more disks as data storage mediums, each including a plurality of data records comprising:

a first head which reads data stored in a data record;

a second head positionable over the data record from which said first head has read data and being spaced from said first head a distance sufficient to produce a time delay of a predetermined amount when said data record moves from a position under said first head to a position under said second head, said second head performing a write operation into the data record when said data record moves to a position under said second head;

an actuator having said first head and said second head securely mounted thereon and performing a seek operation; and an updated data generator means for causing said first head to read said data stored in the data record, for generating new data from the data thus read out, and for causing said second head to write the new data into said data record when said data record moves sequentially from a position under said first head to a position under said second head.

2. A storage system according to claim 1, wherein said first head and said second head are secured to said actuator so that a gap of more than one record length exists between said first and second heads.

3. A storage system according to claim 1, wherein said time delay equals a time period required for a length of the data record to pass under said first head plus an additional time period equal to a time required for an error correction circuit verify data read by said first head.

4. A storage system according to claim 2, wherein said gap is subtantially equal to said one record length plus a length corresponding to a time required for an error correction circuit to verify validity of data read by said first head.

5. In a storage system connected to a processing device for storing data used by the processing device, said storage system comprising:

a first disk drive including:
  a disk having a plurality of records containing data,
  a first head which reads data held in a record on the disk, and
  a second head that positions itself over said record read by said first head after a time delay with respect to the positioning of the first head and writes data into said record;
a second disk drive including:
  a disk having a plurality of records wherein at least one record contains redundant data corresponding to the data in a same parity group of disk drives other than said second disk drive,
  a third head to read redundant data held in a record on the disk, and
  a fourth head that positions itself over said same record read by said third head after a time delay with respect to the positioning of the third head;
a data transfer apparatus which transfers data to and from the processing device; and
a controller which, when storing the data received from the data transfer apparatus into a record in the first disk drive, uses the first head of the first disk drive and reads old data stored in a record into which the received data is to be written and also old redundant data stored in a record in the second disk drive and corresponding to the old data, generates new redundant data from the received data, the old data and the old redundant data controls the first disk drive to write the received data into the record in which the old data was stored when the second head first positions itself on the record after the old data was read out, and at the same time controls the second disk drive to write the new redundant data into the record in which the old redundant data was stored when the fourth head first positions itself on the record after the old redundant data was read out.

6. A storage system according to claim 5, wherein said first disk drive has a single actuator that has said first and second heads securely mounted thereon and performs a seek operation, and said second disk drive has a single actuator that has said third and fourth heads securely mounted thereon and performs a seek operation.

7. A storage system according to claim 5, wherein said first disk drive has a first actuator, which has said first head securely mounted thereon and performs a seek operation, and a second actuator, which has said second head securely mounted thereon and performs a seek operation.

8. A storage system according to claim 5, wherein when writing the received data, said controller controls said first and second actuators so that said first and second heads are positioned over the same track on the disk that contains the record into which the received data is to be written.

9. A storage system according to claim 5, wherein the second disk drive has a third actuator having said third head securely mounted thereon and a fourth actuator having said fourth head securely mounted thereon.

10. A storage system according to claim 9, wherein when writing the received data, said controller controls said third and fourth actuators so that said third and fourth heads are positioned over the same track on the disk that contains the record into which the received data is to be written.

11. A storage system according to claim 5, wherein said controller comprises:

differential data generation apparatus which generates, from the received data and the old data, differential data used to generate new redundant data; and redundant data generation apparatus which generates new redundant data from the differential data produced by the differential data generation means and the old redundant data.

12. A storage system according to claim 11, wherein the differential data generation apparatus has apparatus which obtains an exclusive-OR of the received data and the old data, and the redundant data generation apparatus has apparatus which obtains an exclusive-OR of the differential data and the old redundant data.

13. A storage system according to claim 11, wherein said redundant data generation apparatus is provided in said second disk drive.

14. A storage system according to claim 5, wherein at least a part of said controller is included in said first and the second disk drives.

15. A storage system according to claim 5, wherein said controller includes redundant data generation apparatus which generates the new redundant data from the received data, the old data and the old redundant data.

16. A storage system according to claim 15, wherein said redundant data generation apparatus is provided in the second disk drive.

17. A storage system according to claim 5 to claim 14, wherein said first disk drive and said second disk drive each has a plurality of disk drives.

18. A storage system according to claim 5, wherein an interval of more than one record length is provided between said first head and said second head and between said third head and said fourth head.

19. A storage system according to claim 18, wherein said first disk drive has a fifth head used to position said second head over the record read by said first head, and said second disk drive has a sixth head used to position said fourth head over the record read by said third head.

20. A storage system according to claim 19, wherein said fifth and sixth heads are dedicated for reading.

21. A storage system connected to a processing device for storing data used by the processing device, said storage system comprising:

a first disk drive including:
  a disk having a plurality of records containing data,
  a first head which reads data held in a record on the disk, and
  a second head that positions itself over said record read by said first record after a time delay with respect to the positioning of said first head and writes data into said record;

a second disk drive including:
  a disk having a plurality of records wherein at least one record contains redundant data corresponding to the data held in a same parity group of disk drives other than said second disk drive,
  a third head which reads redundant data held in a record on the disk; and
  a fourth head that positions itself over said record read by said third head with a time delay with respect to said third head;

a data transfer apparatus which transfers data to and from the processing device;

a first controller which, through the first head of the first disk drive, reads old data stored in a record into which the received data is to be written when the data apparatus receives from the processing device the data to be written into the first disk drive, and which writes the received data into the record in which the old data was stored when the second head is first positioned on the record after the old data has been read out;

a second controller which reads old redundant data stored in a record in the second disk drive and corresponding to the old data when the data transfer apparatus receives from the processing device the data to be written into the first disk drive, and which writes new redundant data into the record when the fourth head is first positioned on the record in which the old redundant data was stored; and apparatus which generates new redundant data from the received data, the old data read out by the first controller, and the old redundant data read out by the second controller.

22. A storage system according to claim 21, wherein said first controller is provided in said first disk drive.

23. A storage system according to claim 21, wherein said second controller is provided in said second disk drive.

24. A storage system according to claim 21, wherein said apparatus which generates the redundant data is provided in said second disk drive.

25. In a storage system connected to a processing device for storing data used by the processing device, said storage system comprising:

a first disk drive including:
  a disk having a plurality of records containing data,
  a first head which reads data held in a record on the disk, and
  a second head that positions itself over said record read by said first head after a time delay with respect to the positioning of the first head and writes data into said record;

a second disk drive including:
  a disk having a plurality of records wherein at least one record contains redundant data corresponding to the data held in a same parity group of disk drives other than said second disk drive,
  a third head to read redundant data held in a record on the disk, and
  a fourth head that positions itself over said record read by said third head after a time delay with respect to said positioning of said third head;

data transfer means to transfer data to and from said processing device;

a first controller which, through said first head of the first disk drive, reads old data stored in a record into which the received data is to be written when the data transfer apparatus receives from the processing device the data to be written into said first disk drive, and writes the received data into the record in which the old data was stored when said second head is first positioned on the record after the old data has been read out;

a differential data generation apparatus which generates differential data from the old data read out by the first control means and the received data;

a second controller which reads old redundant data stored in a record in the second disk drive and corresponding to the old data when the data transfer apparatus receives from the processing device the data to be written into the first disk drive, generates new redundant data from the differential data generated by the differential data generation apparatus and the old redundant data, and which writes the new redundant data into the record when the fourth head is first positioned on the record in which the old redundant data was stored.

26. A storage system according to claim 25, wherein said first controller is provided in said first disk drive.

27. A storage system according to claims 25 or 24, wherein said second controller is provided in said second disk drive.

28. In a storage system connected to a processing device to store data used by the processing device, the storage system comprising:

a first disk drive including:
  a disk having a plurality of records containing data,
  a first head to read data held in a record on the disk, and
  a second head that positions itself on the same record with a time delay with respect to the first head and writes data into the record on the disk;

a second disk drive including:
  a disk having a plurality of records containing redundant data corresponding to the data held in each record of the first disk drive,
  a third head to read redundant data held in a record on the disk, and
  a fourth head that positions itself on the same record with a time delay with respect to the third head;

a data transfer means to transfer data to and from the processing device; and a control means which, when storing the data received from the data transfer means into a record in the first disk drive, uses the first head of the first disk drive and reads old data stored in a record into which the received data is to be written and also old redundant data stored in a record in the second disk drive and corresponding to the old data; which generates new redundant data from the received data, the old data and the old redundant data; which controls the first disk drive to write the received data into the record in which the old data was stored when the second head first positions itself on the record after the old data was read out; and which at the same time controls the second disk drive to write the new redundant data into the record in which the old redundant data was stored when the fourth head first positions itself on the record after the old redundant data was read out.

29. In a storage system connected to a processing device to store data used by the processing device, the storage system comprising:

a first disk drive including:

a disk having a plurality of records containing data,
a first head to read data held in a record on the disk, and
a second head that positions itself on the same record with a time delay with respect to the first head and writes data into the record on the disk;
a second disk drive including:
a disk having a plurality of records containing redundant data corresponding to the data held in each record of the first disk drive,
a third head to read redundant data held in a record on the disk, and
a fourth head that positions itself on the same record with a time delay with respect to the third head;
a data transfer means to transfer data to and from the processing device;
a first control means which, through the first head of the first disk drive, reads old data stored in a record into which the received data is to be written when the data transfer means receives from the processing device the data to be written into the first disk drive; and which writes the received data into the record in which the old data was stored when the second head is first positioned on the record after the old data has been read out;
a second control means which reads old redundant data stored in a record in the second disk drive and corresponding to the old data when the data transfer means receives from the processing device the data to be written into the first disk drive; and Which writes new redundant data into the record when the fourth head is first positioned on the record in which the old redundant data was stored; and
a means to generate new redundant data from the received data, the old data read out by the first control means, and the old redundant data read out by the second control means.

30. In a storage system connected to a processing device to store data used by the processing device, the storage system comprising:
a first disk drive including:
a disk having a plurality of records containing data,
a first head to read data held in a record on the disk; and
a second head that positions itself on the same record with a time delay with respect to the first head and writes data into the record on the disk,
a second disk drive including:
a disk having a plurality of records containing redundant data corresponding to the data held in each record of the first disk drive,
a third head to read redundant data held in a record on the disk, and
a fourth head that positions itself on the same record with a time delay with respect to the third head;
a data transfer means to transfer data to and from the processing device;
a first control means which, through the first head of the first disk drive, reads old data stored in a record into which the received data is to be written when the data transfer means receives from the processing device the data to be written into the first disk drive, and which writes the received data into the record in which the old data was stored when the second head is first positioned on the record after the old data has been read out;
a differential data generation means to generate differential data from the old data read out by the first control means and the received data;
a second control means which reads old redundant data stored in a record in the second disk drive and corresponding to the old data when the data transfer means receives from the processing device the data to be written into the first disk drive; which generates new redundant data from the differential data generated by the differential data generation means and the old redundant data, and which writes the new redundant data into the record when the fourth head is first positioned on the record in which the old redundant data was stored.

31. In a storage system connected to a processing device for storing data used by the processing device, said storage system comprising:
a first disk drive including:
a disk having a data record containing data,
a first head which reads data held in a record on the disk, and
a second head that positions itself over said record read by said first head after a time delay with respect to the positioning of said first head and writes data into said record;
a second disk drive including:
a disk having a parity record containing redundant data corresponding to the data held in said data record of first disk drive,
a third head which reads redundant data held in a record on the disk, and
a fourth head that positions itself over said record read by said third head after a time delay with respect to the positioning of the third head;
a data transfer apparatus which transfers data to and from the processing device; and
a controller which, when storing the data received from the data transfer apparatus into a record in the first disk drive, uses the first head of the first disk drive and reads old data stored in a record into which the received data is to be written and also old redundant data stored in a record in the second disk drive and corresponding to the old data, generates new redundant data from the received data, the old data and the old redundant data controls the first disk drive to write the received data into the record in which the old data was stored when the second head first positions itself on the record after the old data was read out, and at the same time controls the second disk drive to write the new redundant data into the record in which the old redundant data was stored when the fourth head first positions itself on the record after the old redundant data was read out.

32. A storage system connected to a processing device for storing data used by the processing device, said storage system comprising:
a first disk drive including:
a disk having a data record containing data,
a first head which reads data held in a record on the disk, and
a second head that positions itself over said record read by said first head after a time delay with respect to the positioning of said first head and writes data into said record;
a second disk drive including:
a disk having a parity record containing redundant data corresponding to the data held in said data record,
a third head which reads redundant data held in a record on the disk; and a fourth head that positions itself over said record read by said third head with a time delay with respect to said third head;

a data transfer apparatus which transfers data to and from the processing device;

a first controller which, through the first head of the first disk drive, reads old data stored in a record into which the received data is to be written when the data apparatus receives from the processing device the data to be written into the first disk drive, and writes the received data into the record in which the old data was stored when the second head is first positioned on the record after the old data has been read out;

a second controller which reads old redundant data stored in a record in the second disk drive and corresponding to the old data when the data transfer apparatus receives from the processing device the data to be written into the first disk drive, and writes new redundant data into the record when the fourth head is first positioned on the record in which the old redundant data was stored; and apparatus which generates new redundant data from the received data, the old data read out by the first controller, and the old redundant data read out by the second controller.

33. In a storage system connected to a processing device for storing data used by the processing device, said storage system comprising:

a first disk drive including:
- a disk having a data record containing data,
- a first head which reads data held in a record on the disk, and
- a second head that positions itself over said record read by said first head after a time delay with respect to the positioning of said first head and writes data into said record;

a second disk drive including:
- a disk having a parity record containing redundant data corresponding to the data held in a said parity data record,
- a third head to read redundant data held in a record on the disk, and
- a fourth head that positions itself over said record read by said third head after a time delay with respect to said positioning of said third head;

data transfer means to transfer data to and from said processing device;

a first controller which, through said first head of the first disk drive, reads old data stored in a record into which the received data is to be written when the data transfer apparatus receives from the processing device the data to be written into said first disk drive, and writes the received data into the record in which the old data was stored when said second head is first positioned on the record after the old data has been read out;

a differential data generation apparatus which generates differential data from the old data read out by the first control means and the received data;

a second controller which reads old redundant data stored in a record in the second disk drive and corresponding to the old data when the data transfer apparatus receives from the processing device the data to be written into the first disk drive, generates new redundant data from the differential data generated by the differential data generation apparatus and the old redundant data, and which writes the new redundant data into the record when the fourth head is first positioned on the record in which the old redundant data was stored.

* * * * *